US006963976B1

(12) United States Patent
Jutla

(10) Patent No.: US 6,963,976 B1
(45) Date of Patent: Nov. 8, 2005

(54) SYMMETRIC KEY AUTHENTICATED ENCRYPTION SCHEMES

(75) Inventor: Charanjit Singh Jutla, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 09/705,998

(22) Filed: Nov. 3, 2000

(51) Int. Cl.[7] ................................................ H04L 9/00
(52) U.S. Cl. .......................... 713/181; 713/168; 707/9
(58) Field of Search ............................... 380/43, 10, 46, 380/37, 50, 4, 21, 216; 314/717; 713/165, 713/168, 181; 707/9

(56) References Cited

U.S. PATENT DOCUMENTS

| 5,195,136 A | * | 3/1993 | Hardy et al. ................. 380/43 |
| 5,570,307 A | * | 10/1996 | Takahashi ................... 708/256 |
| 5,940,507 A | * | 8/1999 | Cane et al. .................. 713/165 |
| 5,974,144 A | * | 10/1999 | Brandman .................. 380/216 |

FOREIGN PATENT DOCUMENTS

EP 1063811 A1 * 12/2000 ............. H04L 9/06

OTHER PUBLICATIONS

M. Bellare, A. Desai, E. Jokiph, P. Rogaway, "A Concrete Security Treatment of Symmetric Encryption: Analysis of DES Modes of Operation", 38th IEEE FOCS, 1997.

M. Bellare, J. Kilian, P. Rogaway, "The Security of Cipher Block Chaining", CRYPTO 94, LNCS 839, 1994.

V.D. Gligor, P. Donescu, "Integrity Aware PCBC Encryption Schemes", 7th Intl. Workshop on Security Protocols, Cambridge, LNCS, 1999.

V.G. Gligor, P. Donescu, Fast Encryption and Authentication: XCBC Encryption and XECB Authentication Modes "http://www.nist.gov/aes/modes".

* cited by examiner

Primary Examiner—Charles Rones
Assistant Examiner—Jacob F. Bétit
(74) Attorney, Agent, or Firm—Louis P. Herzberg

(57) ABSTRACT

The present invention provides encryption schemes and apparatus which securely generate a cipher-text which in itself contains checks for assuring message integrity. It also provides compatible decryption schemes confirming message integrity. The encryption scheme generates a cipher-text with message integrity in a single pass with little additional computational cost, while retaining at least the same level of security as schemes based on a MAC. One embodiment encrypts a plain-text message by dividing the plain-text message into a multitude of plain-text blocks and encrypting the plain-text blocks to form a multitude of cipher-text blocks. A single pass technique is used in this process to embed a message integrity check in the cipher-text block. A message integrity check is embedded in the cipher-text blocks by embedding a set of pseudo random numbers, which may be dependent, but are pair-wise differentially uniform. We also describe an embodiment which is highly parallelizable.

47 Claims, 12 Drawing Sheets

US 6,963,976 B1

SYMMETRIC KEY AUTHENTICATED ENCRYPTION SCHEMES

FIELD OF INVENTION

Figure 1:
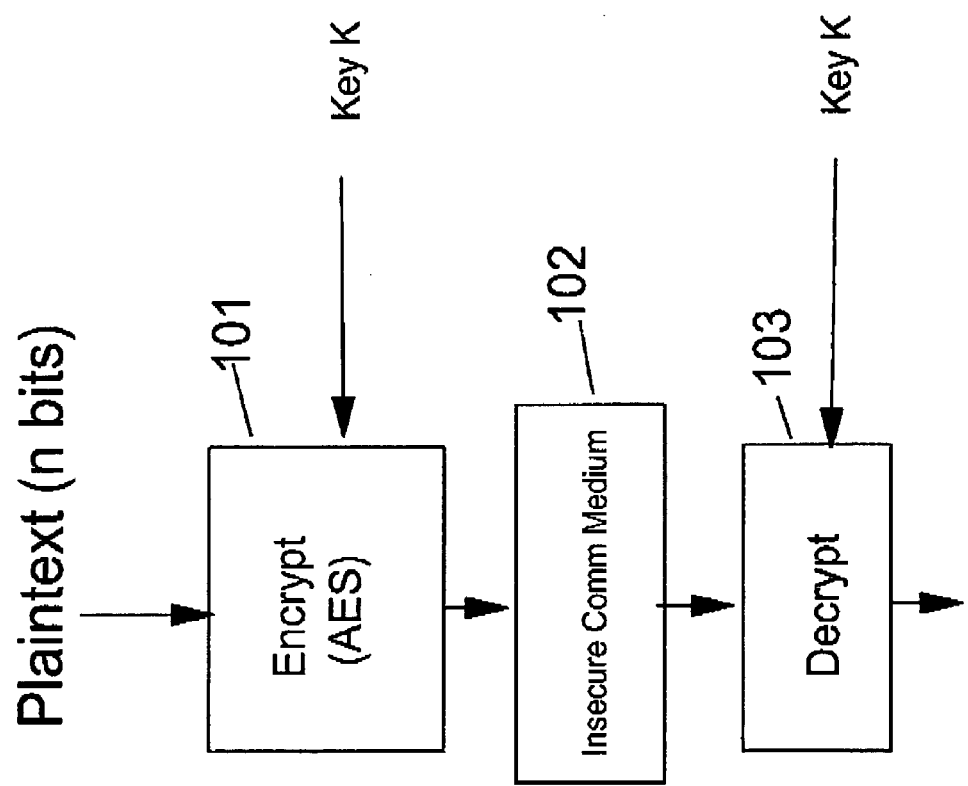

This invention relates to a method and apparatus for cryptographically transforming an input message into an output message while assuring message integrity.

BACKGROUND OF INVENTION

Cryptographic systems are known in the data processing art. In general, these systems operate by performing an encryption operation on a plain-text input message, using an encryption key, and a symmetric key block cipher, producing a cipher-text message. The encrypted message may then be sent over an unreliable and insecure channel to a receiver who shares the secret key. The receiver of the encrypted message performs a corresponding decryption operation, using the same key to recover the plain-text block. Because the same key is used by both the sender and receiver of the message, the process is referred to as a "symmetric key" process.

There is a related issue of message integrity. To elaborate, although the receiver of the cipher-text message can decrypt the cipher-text, the receiver is not assured that the cipher-text was not accidentally or maliciously altered during transmission. To ensure message integrity, the cipher-text message come accompanied with a message authentication code (MAC). This MAC is generated by the sender from the cipher-text using a cryptographic hash function.

Usually, the total computational time spent on encrypting the message is of the same order of magnitude as the time spent computing the subsequent MAC. Thus, two passes of equal duration are required to produce a cipher-text message along with its integrity assuring MAC.

Other ways have been described to achieve message integrity along with encryption. In these ways, a few extra steps of preparing a new random sequence are taken. The generated random sequence is then embedded into the cipher-text, and that is claimed to assure message integrity. The advantage of these alternatives over the MAC is that the extra steps taken are far fewer than required for computing the MAC.

Among the other ways, one requires two extra steps, and another requires just one extra step. However, the latter is less secure than schemes using a MAC. Thus, there is a tradeoff in performance.

SUMMARY OF THE INVENTION

An object of the present invention is to provide encryption and decryption schemes and apparatus which securely generate a cipher-text which in itself contains checks for assuring message integrity.

Another object of this invention is to provide encryption and decryption schemes and apparatus which generate a cipher-text with message integrity in a single pass with almost no additional computational cost, while retaining at least the same level of security as schemes based on a MAC.

Another object of this invention is to provide highly parallelizable encryption and decryption schemes and apparatus which generate a cipher-text with message integrity with almost no additional computational cost, while retaining at least the same level of security as schemes based on a MAC.

Another object of this invention is to provide encryption and decryption schemes and apparatus which generate a cipher-text with message integrity by utilizing the concept of pairwise differentially uniform random numbers.

DETAILED DESCRIPTION OF THE INVENTION

These and other objects are attained with encryption/decryption methods and apparatus of the present invention. An embodiment of a method comprises the steps of encrypting a plain-text message by dividing the plain-text message into a multitude of plain-text blocks and encrypting the plain-text blocks to form a multitude of cipher-text blocks. A single pass technique is used in this process to embed a message integrity check in the cipher-text block. The method further comprises the step of decrypting the cipher-text blocks to reform the plain-text blocks, and testing the message integrity check in the cipher-text blocks to test the integrity of the reformed plain-text blocks.

It is often advantageous to employ embodiments in which the message integrity check is embedded in the cipher-text blocks by generating a random number, expanding this random number to generate a set of pseudo random numbers, which may be dependent, but are pair-wise differentially uniform in the sense to be defined below, and using the random number and the set of pseudo random numbers to embed the message integrity check in the cipher-text blocks as the cipher-text blocks are being formed. In these embodiments, during the decryption process, the random number and the set of pseudo random numbers are obtained from the cipher-text blocks, and as the cipher-text blocks are decrypted, these set of pseudo random numbers are used to reform the plain-text blocks from the cipher-text blocks. Also, the testing step advantageously includes the step of applying a predetermined test to the re-formed plain-text blocks to test the integrity of the re-formed plain-text blocks.

It is often advantageous to employ embodiments in which the pairwise differentially uniform pseudo random numbers are embedded in both the plain-text and the cipher-text blocks, leading to encryption schemes which are highly parallelizable.

A sequence of n-bit uniformly distributed random numbers $S_1, S_2, \ldots S_m$ is called "pair-wise differentially-uniform" if for every n-bit constant number c, and for every pair of indices i, j, i different from j, the probability that the exclusive or function applied to $S_i$ and $S_j$ results in c is 1 in $2^n$. Of course, each individual variable $S_i$ is random and uniformly distributed if and only if for each n-bit constant number c, the probability that $S_i$ equals c is 1 in $2^n$. A variable which only approximates this probability in a computational sense is well known in literature as a pseudo random number. The sequence of variables $S_1, S_2, \ldots, S_m$ will be called pair-wise differentially-uniform pseudo random numbers if all or some of the probabilities are approximate in the above sense.

It should be noted that a pair-wise independent sequence is a pair-wise differentially-uniform sequence; hence the latter is a weaker property. However the latter can be computationally cheaper to generate as the following detailed description shows. Surprisingly, it suffices to embed a pairwise differentially uniform sequence instead of a pairwise independent sequence to assure message integrity.

We now define sequences which are pair-wise differentially-uniform in Galois Field modulo a prime number p, i.e. GFp. A sequence of n-bit random numbers uniformly distributed in GFp, $S_1, S_2, \ldots S_m$ is herein called "pair-wise differentially-uniform in GFp" if for every constant number c in GFp, and for every pair of indices i, j, i different from j, the probability that $(S_i-S_j)$ modulo p results in c is 1 in p.

Further benefits and advantages of the invention will become apparent from a consideration of the following detailed description, given with reference to the accompanying drawings, which specify and show example embodiments of the invention.

In this specification and the drawings, a plain-text message is denoted by "P", and a cipher-text message is denoted by "C". The length of the plain-text and cipher-text are measured in blocks, where a block is the number of bits of input/output of a block cipher used in this construction. In the rest of the document the number n will be used to refer to the number of bits in a block. Thus, if the plain-text P is of length m blocks, then the individual blocks of this message are designated $P_1, P_2, \ldots, P_m$. Similarly, the cipher-text blocks are designated $C_1, C_2, \ldots, C_m$.

Figure 2:
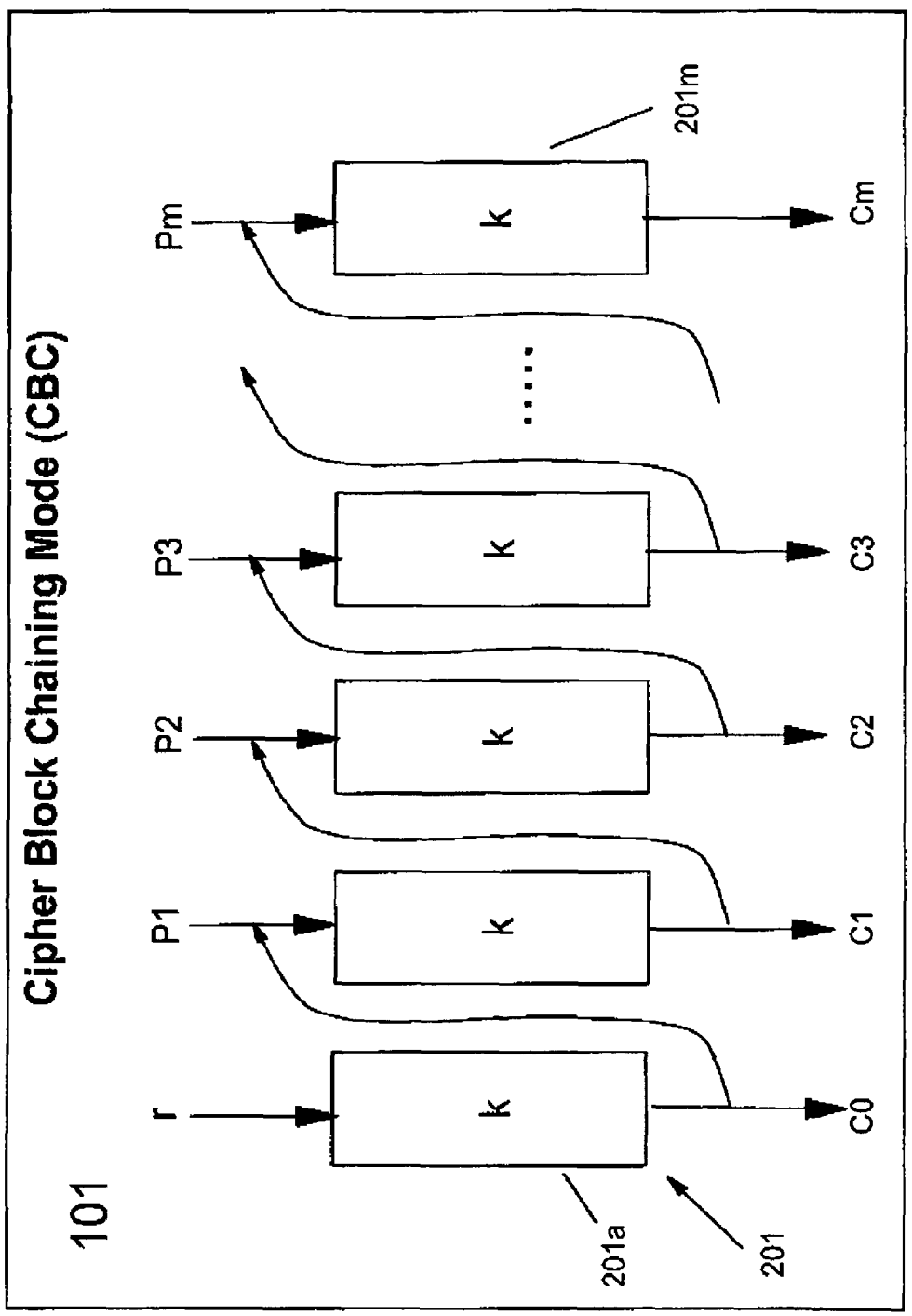
Figure 3:
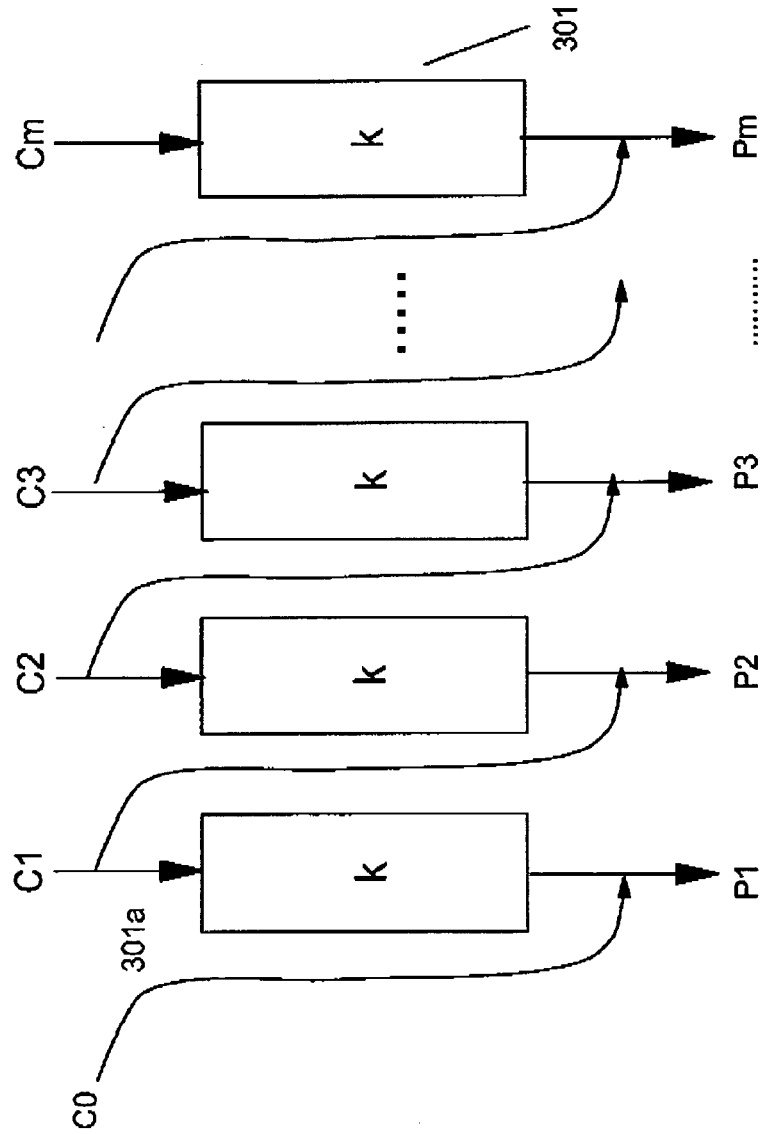

FIGS. 1–3 generally illustrate an encryption/decryption procedure of the type referred to as cipher block chaining (CBC). In this process, a sending party encrypts a plain-text message using encryption mechanism 101, and the encrypted message is sent over an insecure or non-secure communication medium 102 to a receiving party. This latter party uses a decryption mechanism 103 to decipher the message. Note that both parties have access to the same secret key K.

FIGS. 2 and 3 respectively show the encryption and decryption mechanisms 101 and 103 in greater detail. With reference to FIG. 2, mechanism 101 includes a series of cipher blocks 201. Each cipher block is provided with the key K. The first block 201a is also provided with a random number r that is n bits long. Each of the successive cipher blocks in the chain is provided with a respective one block of the plain-text and with the output of the previous block in the chain. Advantageously, for each of the cipher blocks after the first one, an exclusive or function is applied to the two text blocks applied to the cipher block. Each of the cipher blocks 201a–201m outputs a respective one block of the cipher-text.

With reference to FIG. 3, mechanism 103 includes a series, or chain, of cipher blocks 301. Each block is provided with the key K and with a respective one of the cipher-text blocks. For the first block 301a in chain 301, an exclusive or operation is applied to the output of the block and the first cipher-text block. For the other blocks in chain 301, an exclusive or operation is applied to the output of the block and the input of the previous block. The exclusive or operations performed on the outputs of the cipher blocks produce the original plain-text blocks.

FIGS. 4–7 illustrate an encryption/decryption process embodying an example of the present invention. Generally, the encryption process includes three steps. The first step is the randomness generation and its expansion. The second step is the further expansion of the randomness, and the third step is the actual encryption of the plain-text using the above generated randomness to produce the cipher-text.

More specifically, in the first step, a random number r is generated. The randomness r may be generated by any of the well known techniques to generate randomness. This number r is applied to the block cipher 401 with key K2 to produce a pseudo random number R. The number R could also be obtained by any other well known means of expanding randomness.

This number R is fed into a pair-wise differentially uniform sequence generator 402. This generator, using a process discussed below, outputs a series of S values, $S_0, S_1, S_2, \ldots S_m$, each of which is also n bits long.

Figure 5:
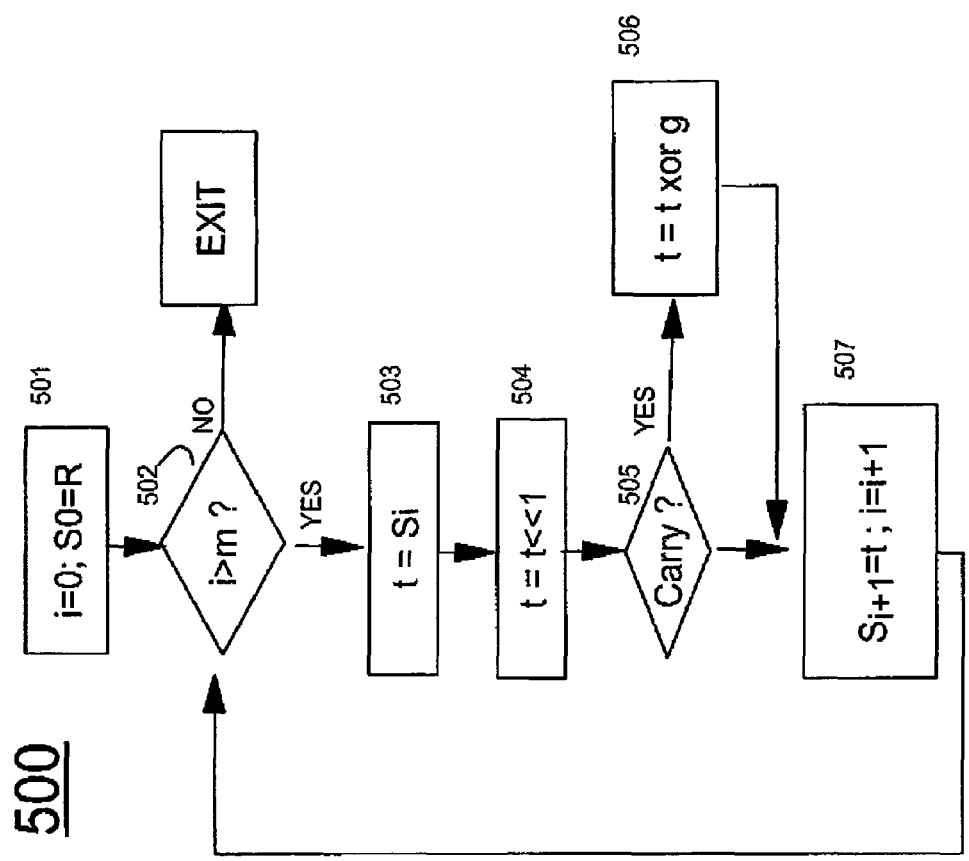

FIG. 5 is a flow chart 500 showing how generator 402 works. This generator may work as a well known Linear Feedback Shift Register (LFSR). First a primitive polynomial g(x) representing the Galois Field $GF(2^n)$ is chosen. Such polynomials are well known and published in literature. Let g stand for the n-bit number representing $g(x)-x^n$. At step 501, a variable i is set equal to 0, and $S_0$ is set equal to R; and then at step 502, i is compared to m. If i is greater than m, then the routine exits. Otherwise, the routine proceeds to 503, 504, 505. At step 503, the variable $S_i$ is copied into a temporary variable t. At step 504, t is left shifted by 1 bit. At step 505, it is checked if there was a carry produced from the previous shift operation. If so, the quantity g and t are combined by a bit by bit exclusive or operation to produce the new t. If there was no carry produced, then t is left intact. At step 507, variable $S_{i+1}$ is set to t and i is incremented by 1, and the routine returns to step 502. An important advantage of this process is that the expansion does not require any cryptographic operations, like block ciphers.

It is well known that to generate a pair-wise independent sequence at least two pseudo random numbers are required, as opposed to just one (i.e. R) that is required to generate a pair-wise differntially uniform sequence.

With reference again to FIG. 4, after r and the S values are generated, the blocks of plain-text $P_1-P_m$ are encrypted to obtain the cipher-text blocks $C_0-C_{m+1}$. A series of m+2 cipher blocks 403 are used to do this. Each of the cipher blocks is provided with the key K1. The first block 403a is also provided with the random number r. Each of the following cipher blocks, except the last one 403n, is provided with a combination of a respective one of the plain-text blocks and the output of the preceding cipher block. In particular, this combination is the result of the exclusive or operation performed on the two inputs, on a bit location by bit location basis. The last cipher block 403n in the series is provided with the combination of (i) the output of the previous block, and (ii) the result of a series of exclusive or operations performed on the sequence of plain-text blocks $P_1, P_2, \ldots P_m$. This combination is the result of the exclusive or operation performed on the two inputs.

The output of the first cipher block 403a is the first block of cipher-text $C_0$. The other blocks of cipher-text, $C_1-C_m$, are obtained by performing the exclusive or operation, on a bit location by bit location basis, on the output of each cipher block and a respective one of the S values. Specifically, $S_1-S_m$, are applied to the outputs of blocks 403b through 403m respectively, while $S_0$ is applied to the output of the last block 403n.

There are other known ways of combining two values of same size. Thus, the above operation of performing the exculsive-or operation on the output of each cipher block and a respective one of the S values may be generalized to other ways of combining two values of size one block each. In particular, any group structure well known in algebra, whose elements are of size upto one block, supports addition of two elements of that group. Such an addition of two elements of a group may also be used to combine the output of each cipher block and a respective one of the S values.

As an even more specific example, if an S value is an element of a Galois Field GFp, then the S value may be added modulo p to the output of a cipher block, where p is a prime number. Even though the output of a block cipher is of n bits, and p may be less than $2^n$, the output of the block cipher can still be viewed as an element of GFp.

Known techniques may be employed to perform the first and second steps of the encryption process. The third step is unique in the way pair-wise differentially uniform randomness is used in the encryption process so as to ensure message integrity.

The pseudo code for the third step is listed below. Block_Encrypt is a block cipher which encrypts one block using a key. It takes tow arguments. The first argument is the block to be encrypted, and the second argument is the key.

A01 $C_0$=Block_Encrypt(r,K1)
A02 $N_0=C_0$
A03 For i=1 to m−1 do
A04 $N_i$=Block_Encrypt($P_i$ xor N(i−1))
A05 $C_i=N_i$ xor $S_i$
A06 EndFor
A07 Checksum=0
A08 for i=1 to m−1 do
A09 Checksum=Checksum xor $P_i$
A10 EndFor
A11 $C_m=S_0$ xor Block_Encrypt($N_{m-1}$ xor checksum,K1)

Figure 6:
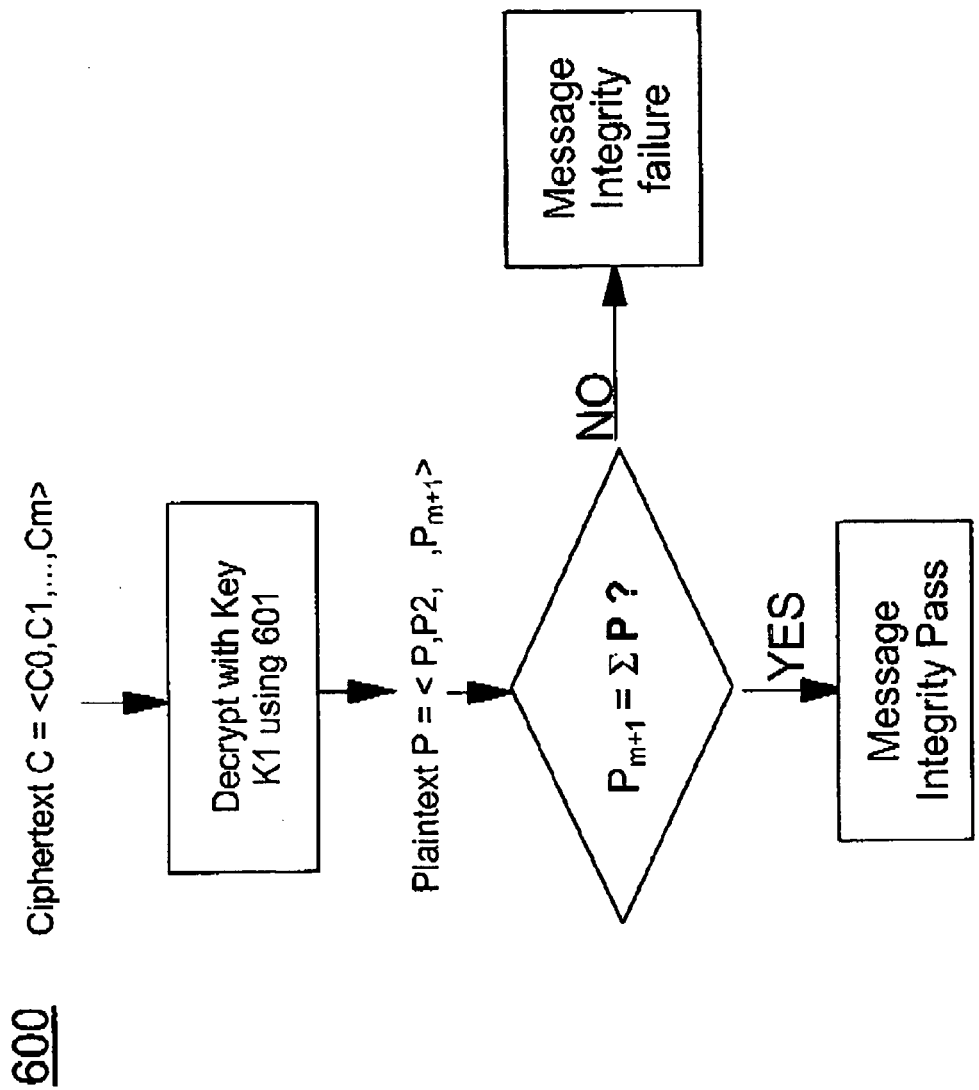

FIG. 6 generally illustrates an example of a decryption process. In this process, the cipher-text blocks are applied to decryption 601, which outputs the plain-text blocks. Then these plain-text blocks are used to determined if $P_{m+1}$ is equal to the result obtained by applying the exclusive or function, on a bit location by bit location basis, to the sequence of the plain-text blocks $P_1, \ldots P_m$. The message passes or fails the integrity test if $P_{m+1}$ is, respectively, equal or not equal to this result.

Figure 7:
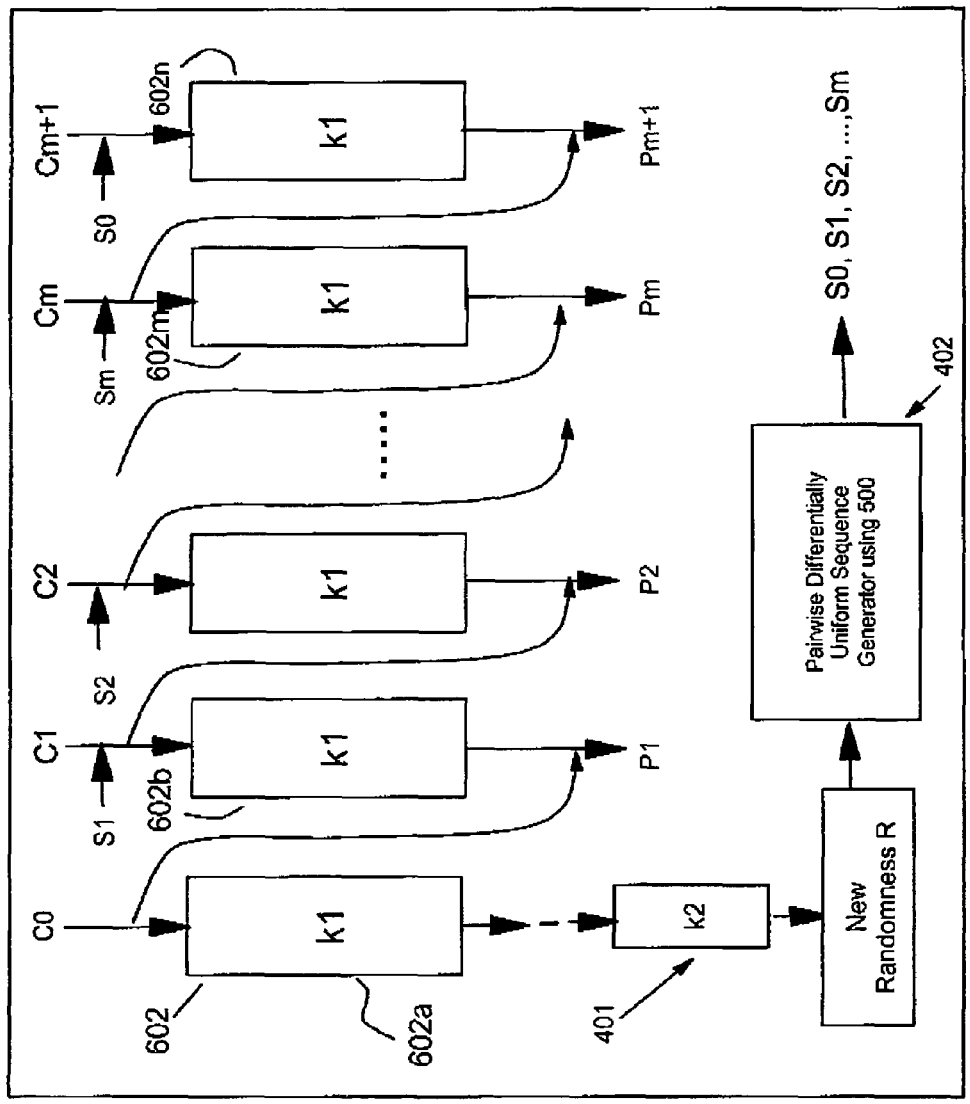

FIG. 7 illustrates the operation of an example of a decryption 601 in greater detail. As shown in this figure, the decryption includes a series of cipher blocks 602. Each of the cipher blocks is provided with a key K, and with a respective one of the cipher-text blocks $C_0, \ldots C_{m+1}$. Each of these blocks, except the first one 602a, is also provided with a respective one of the S values. In particular, blocks 602b through 602m are provided with $S_1$ through $S_m$ respectively, and the last cipher block 602n is provided with $S_0$. The exclusive or operation is performed on the C and S values provided to each cipher block.

The output of the first cipher block 602a is the random number r. For each of the cipher blocks 602b–602n, the exclusive or function is applied to the output of the block and the input to the previous block to obtain a respective one of the plain-text blocks $P_1$–$P_m$.

The pseudo code for decryption process is given below. In this pseudo code, Block_Decrypt refers to a block cipher which decrypts one block using a key. It takes two arguments. The first argument is the block to be decrypted, and the second argument is the key.

B01 r=Block_Decrypt ($C_0$,K1)
B02 Expand r into $S_0,S_1, \ldots S_m$ as in 401 and 402
B03 $N_0=C_0$
B04 For i=1 to m−1 do
B05 $N_i=C_i$ xor $S_i$
B06 $P_i=N_{i-1}$ xor Block_Decrypt($N_i$,K1)
B07 End For
B08 $P_m=N_{m-1}$ xor Block_Decrypt ($C_m$ xor $S_0$, K1)
B08 Checksum=0
B09 For i=1 to m−1
B10 Checksum=Checksum xor $P_i$
B11 EndFor
B12 If $P_m$=Checksum accept decrypted Message P as integral
B13 Else reject P as not integral The pseudo code below is an alternative embodiment using an alternative way to generate the pair-wise differentially uniform random sequence $S_0,S_1, \ldots S_m$. Again, this alternative way uses a primitive polynomial g(x), and arithmetic in a Galois Field. Once again let g stand for the n-bit number representing $g(x)-x^n$. This technique is again well known in literature, and the uniqueness of this invention lies in applying this sequence to the aforementioned third step of the encryption process.

C01 W(0)=R; S(0)=W(0);
C02 for i=1 to m−1 do
C03 j=i+1;
C04 if (j is a power of 2)
C05 W(i)=W(i−1)<<1/* left shift W(i−1) by 1 bit*/
C06 if (most significant bit of W(i−1) is 1) then W(i)=W(i) xor g endif
C07 endif
C08 S(i)=0
C09 for k=0 to n−1 do
C10 if (least significant bit of j is 1) then S(i)=S(i) xor W(k) endif
C11 j=j>>1/* right shift j by 1 bit */
C12 end for
C13 end for There is yet another well known technique for generating the pair-wise differentially uniform random sequence $S_0,S_1, \ldots,S_m$. Once again, it uses a primitive polynomial g(x). Here is the pseudo code for generating the sequence using the well know Gray code:

D01 W(0)=R; S(0)=W(0)
D02 for i=1 to m−1 do
D03 j=i+1
D04 k=0
D05 While ((j&1)==0) do
D06 k=k+1; j=j>>1; /*increment k and right shift j */
D07 end while /* finds the index of the least significant ON bit in (i+1) */
D08 if (j xor 1)==0)/* (i+1) is a power of 2 */
D09 W(k)=W(k−1)<<1/* left shift W(k−1) by 1 bit */
D11 if (most significant bit of W(k−1) is 1) then W(k)=W(k) xor g endif
D12 end if
D13 S(i)=S(i−1) xor W(k)
D14 end for One well versed with the art can come up with many other ways to generate such pair-wise differentially uniform sequence. As long as the sequence satisfies the pair-wise differentially-uniform property it can be embedded as explained earlier to guarantee an encryption scheme with message integrity.

We now describe an alternative embodiment of an encryption scheme in which the pair-wise differentially-uniform sequence is embedded resulting in a secure encryption scheme with message integrity. This encryption scheme is of interest because the same pair-wise differentially-uniform sequence is embedded not just in the output of the cipher blocks, but also in the input blocks. This results in an encryption scheme which is different from the one in FIG. 4, in that the new scheme is highly parallelizable.

Figure 8:
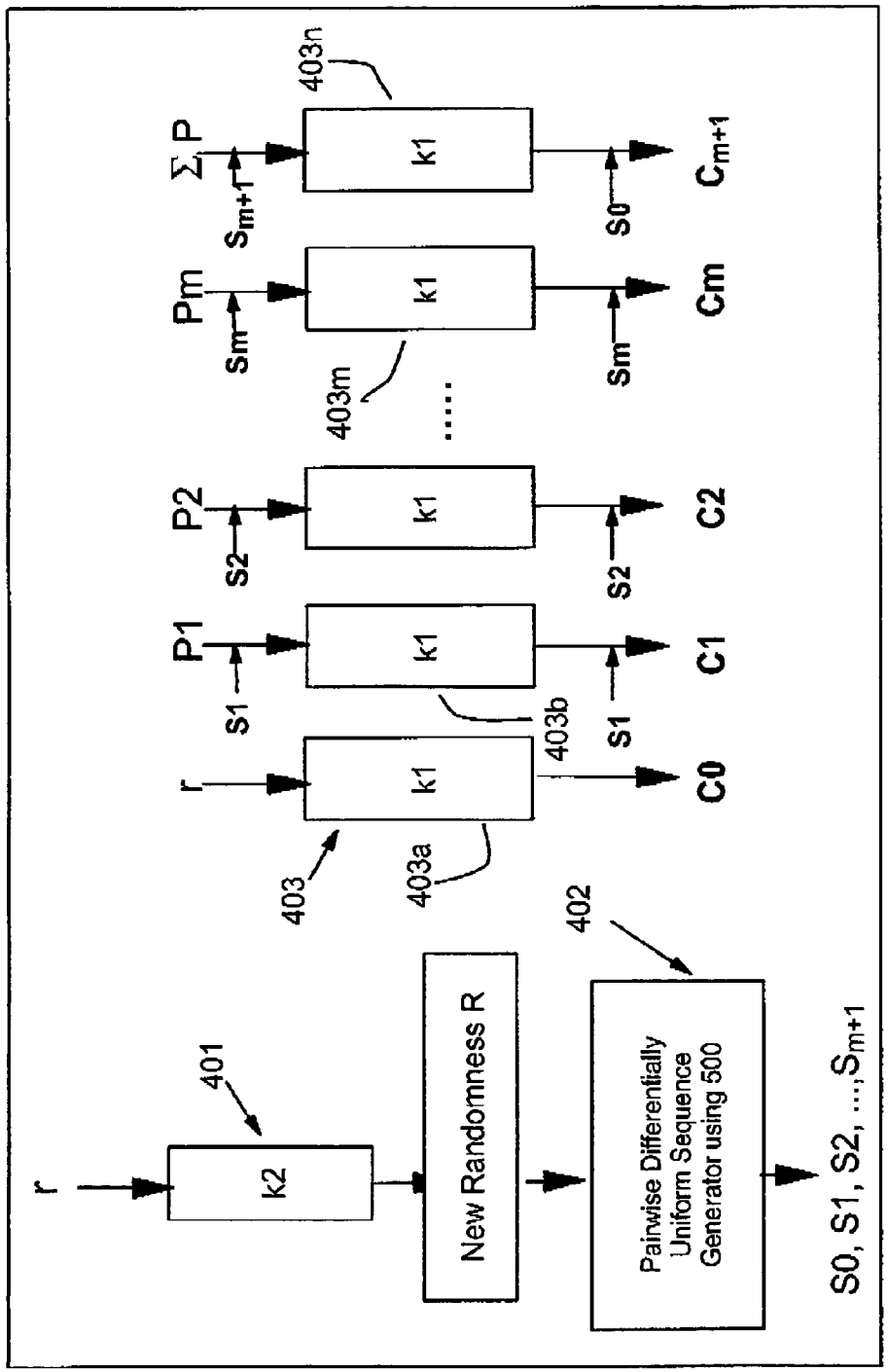

FIG. 8 illustrates this alternative encryption mechanism 800 embodying this invention. In this mechanism, each of the blocks is provided with the key K1. The first block 403a is also provided with the random number r. Each of the following cipher blocks, except the last one, is provided with a combination of a respective one of the plain-text blocks and a respective one of the S values. Specifically, this combination is the result of the exclusive or operation performed on the two inputs, on a bit location by bit location basis. The last cipher block 403n in the series is provided with the combination of (i) $S_{m+1}$ and (ii) the result of a series of exclusive or operations performed on the sequence of plain-text blocks $P_1, P_2, \ldots, P_m$. This combination is the result of exclusive or operation performed on the two inputs.

Figure 4:
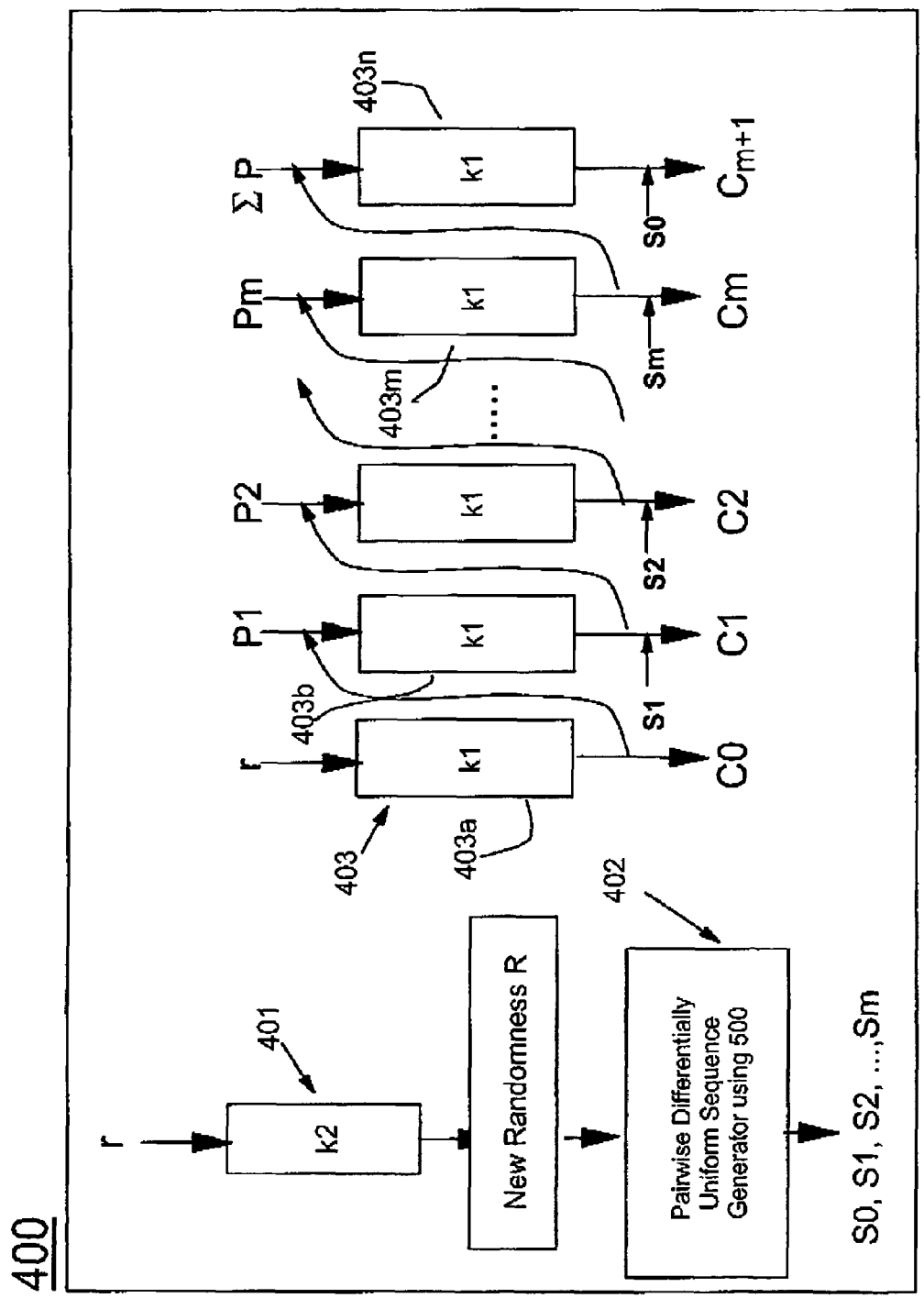

As with the system in FIG. 4, the output of the first cipher block 403a of mechanism 800 is the first blocks of cipher-text $C_0$. The other blocks of cipher-text $C_1$–$C_m$ are obtained by performing the exclusive or operation, on a bit location by bit location basis, on the output of each cipher block and a respective one of the S values. Specifically $S_1$–$S_m$ are applied to the outputs of blocks 403b–403m respectively, while $S_0$ is applied to the output of the last cipher block in the series.

Figure 9:
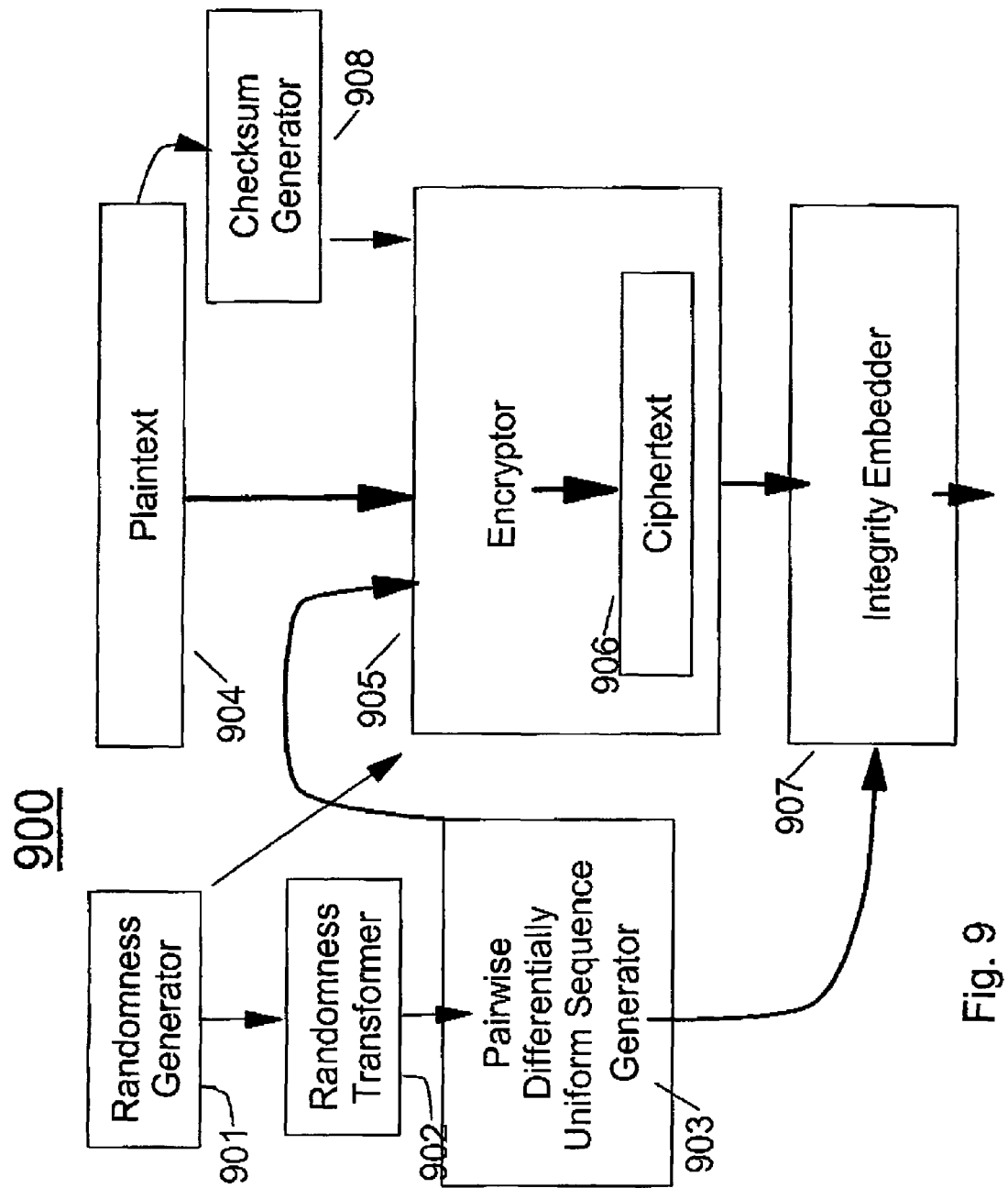

The invention may also be implemented as an apparatus to encrypt a plain-text message 904. An example apparatus is shown in FIG. 9. The apparatus shown includes a Randomness Generator 901 to generate a first random number; a Randomness Transformer 902 to transform said first random number into a first pseudo random number; a Pairwise Differentially Uniform Sequence Generator 903 to further expand a randomness of said first random number and/or said first pseudo random number into a set of pair-wise differentially-uniform pseudo random numbers; an Encryptor 905 to divide said plain-text message into a plurality of plain-text blocks, and to encrypt said plain-text blocks to form a plurality of cipher-text blocks; a Checksum Generator 908 to combine said plurality of plain-text blocks into at least one check sum; and an Integrity Extractor and Checker 907 to employ said set of pair-wise differentially-uniform pseudo random numbers, together with said first random number and/or said first pseudo random number, to embed a message integrity check in said cipher-text blocks.

In an alternative implementation the said pair-wise differentially-uniform pseudo random numbers may also be employed by the encryptor 905. Other apparatus implementations may be used employing modules known to those skilled in the art to provide the functionality to perform the present invention.

Figure 10:
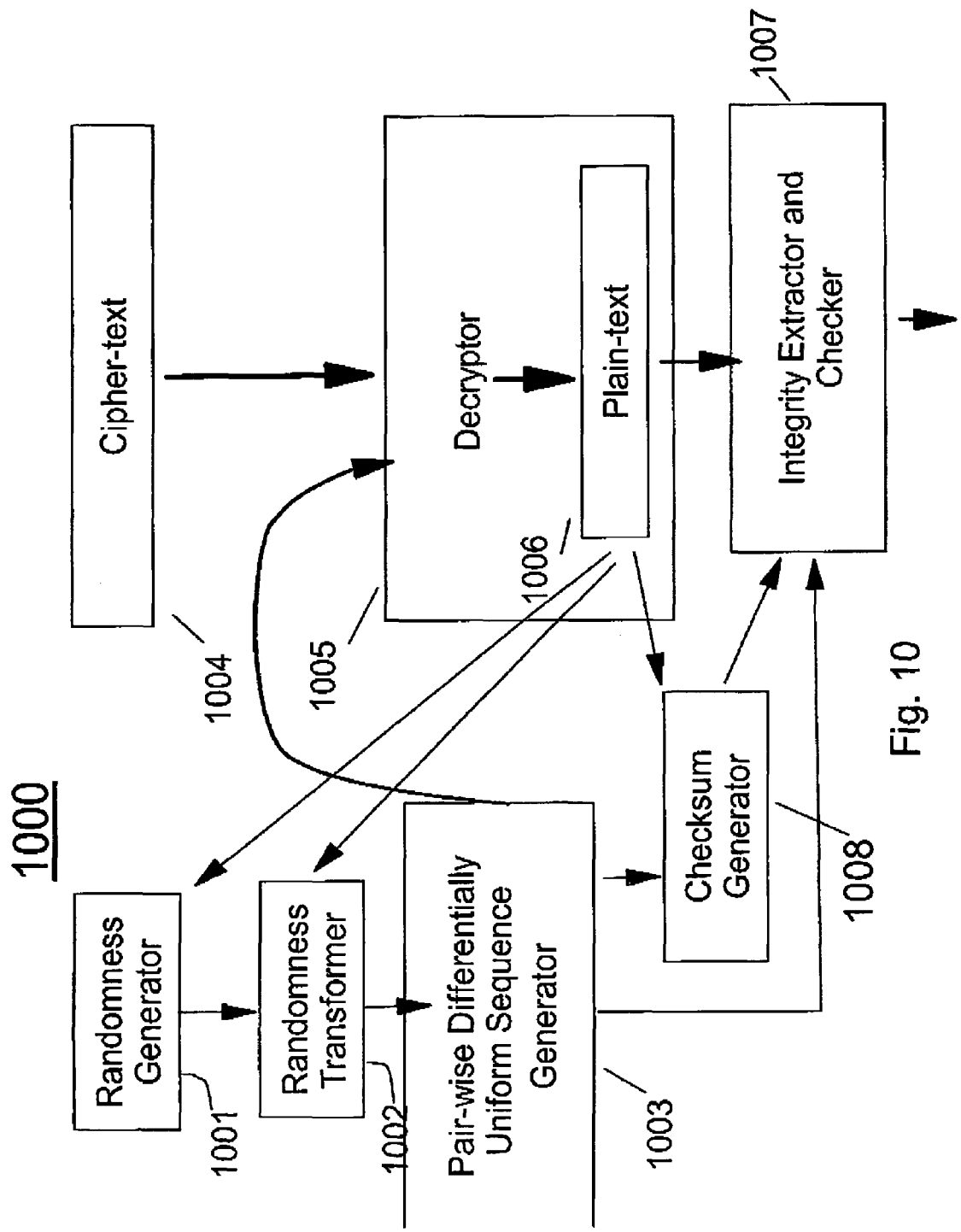

The invention may also be implemented as an apparatus to decrypt a cipher-text message 1004. An example apparatus is shown in FIG. 10. The apparatus shown includes a Decryptor 1005 to divide said cipher-text message 1004 into a plurality of cipher-text blocks, and to decrypt said cipher-text blocks in forming a plurality of plain-text blocks; a Randomness Transformer 1002 to transform at least one of said plain-text blocks into a first pseudo random number; a Pairwise Differentially Uniform Sequence Generator 1003 to further expand at least one of said plain-text blocks and/or said first pseudo random number into a set of pair-wise differentially-uniform pseudo random numbers; a Checksum Generator 1008 to combine said first pseudo random number, and/or said set of pair-wise differentially-uniform pseudo random numbers, and/or said at least one plain-text block to form at least two check sums and to form a plurality of output blocks; and an Integrity Extractor and Checker 1007 to compare said at least two check sums in declaring success of a message integrity check.

In an alternative implementation the said pair-wise differentially-uniform pseudo random numbers may also be employed by the decryptor 1005. Other apparatus implementations may be used employing modules known to those skilled in the art to provide the functionality to perform the present invention.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation and/or reproduction in a different material form.

Thus the present invention includes an embodiment of a method for encrypting a plain-text message. The method includes the steps of: generating a first random number; transforming the first random number into a first pseudo random number; further expanding a randomness of the first random number and/or the first pseudo random number into a set of pair-wise differentially-uniform pseudo random numbers; dividing the plain-text message into a plurality of plain-text blocks; encrypting the plain-text blocks to form a plurality of cipher-text blocks; combining the plurality of plain-text blocks into at least one check sum; and employing the set of pair-wise differentially-uniform pseudo random numbers, together with the first random number and/or the first pseudo random number, to embed a message integrity check in the cipher-text blocks.

In some embodiments of the method for encrypting a plain-text message the step of encrypting the plain-text blocks includes employing the first random number, and/or the first pseudo random number, and/or the set of pair-wise differentially-uniform pseudo random numbers; and/or the step of encrypting includes encrypting the first random number; and/or the step of encrypting includes encrypting the check sum; and/or the step of combining includes obtaining the check sum from an exclusive-or of the plurality of plain-text blocks; and/or the step of transforming the random number includes a non-cryptographic or linear operation; and/or the step of transforming the random number includes a cryptographic operation; and/or the said set of pair-wise differentially-uniform numbers are set of pair-wise differentially-uniform numbers in GFp; and/or the step of employing includes pairing the first random number, and/or the first pseudo random number, and/or the set of pair-wise differentially-uniform pseudo random numbers, with the plurality of cipher-text blocks, and combining each pair to form a plurality of output blocks; and/or the step of combining each pair includes performing an exclusive-or operation upon components of each pair; and/or the step of employing includes pairing the first random number, and/or the first pseudo random number, and/or the set of pair-wise differentially-uniform pseudo random numbers, with the plurality of plain-text blocks, and combining each pair to form a plurality of input blocks used in the step of encrypting; and/or the step of combining each pair includes performing an exclusive-or operation upon components of each pair; and/or the step of combining each pair includes performing a modulo p addition upon components of each pair, where p is a prime number.

Furthermore the present invention includes an embodiment of a method for decrypting a cipher-text message. The method includes the steps of: dividing the cipher-text message into a plurality of cipher-text blocks; decrypting the cipher-text blocks in forming a plurality of plain-text blocks; transforming at least one of the plain-text blocks into a first pseudo random number; further expanding at least one of the plain-text blocks and/or the first pseudo random number into a set of pair-wise differentially-uniform pseudo random numbers; combining the first pseudo random number, and/or the set of pair-wise differentially-uniform pseudo random numbers, and/or the at least one plain-text block to form at least two check sums and to form a plurality of output blocks; and comparing the at least two check sums in declaring success of a message integrity check.

In some embodiments of the method for decrypting a plain-text message the step of decrypting the cipher-text blocks includes employing the first pseudo random number, and/or the set of pair-wise differentially-uniform pseudo random numbers; and/or the step of combining includes pairing said first pseudo random number, and/or said set of pair-wise differentially-uniform pseudo random numbers, with said plurality of plain-text blocks, and using each pair to form a plurality of output blocks and employing the output blocks to form said at least two check sums; and/or the step of using each pair includes performing an exclusive-or operation upon components of said each pair; and/or the step of forming includes dividing the said output blocks into at least two subsets, and obtaining said at least two checksums from an exclusive-or of said subsets of output blocks; and/or the step of transforming said plain-text blocks includes a non-cryptographic or linear operation; and/or the step of transforming said plain-text blocks includes a cryptographic operation; and/or the set of pair-wise differentially-uniform numbers are set of pair-wise differentially-uniform numbers in GFp; and/or the step of employing includes pairing said first random number, and/or said first pseudo random number, and/or said set of pair-wise differentially-uniform pseudo random numbers, with said plurality of cipher-text blocks, and combining each pair to form a plurality of input blocks used in said step of decrypting; and/or the step of combining each pair includes performing a modulo p addition upon components of each pair, where p is a prime number.

The invention may also be implemented as a method for encryption and decryption of a plain-text message. The method may for example include the steps of: generating a first random number; transforming said first random number into a first pseudo random number; further expanding a randomness of said first random number and/or said first pseudo random number into a set of pair-wise differentially-uniform pseudo random numbers; dividing the plain-text message into a plurality of plain-text blocks; encrypting said plain-text blocks in forming a plurality of cipher-text blocks; combining said plurality of plain-text blocks into at least one check sum; and employing said first random number, said first pseudo random number and said set of pair-wise differentially-uniform pseudo random numbers to embed a message integrity check in said cipher-text blocks to form a cipher-text message; dividing said cipher-text message into a plurality of cipher-text blocks to form an encryption of said plain-text message; decrypting said cipher-text blocks in forming a plurality of plain-text blocks; transforming at least one of said plain-text blocks into a first pseudo random number; further expanding at least one of said plain-text blocks and/or said first pseudo random number into a set of pair-wise differentially-uniform pseudo random numbers; combining said first pseudo random number, and/or said set of pair-wise differentially-uniform pseudo random numbers, and/or said at least one plain-text block to form at least two check sums and to re-form the said plain-text message; and comparing said at least two check sums in declaring success of a message integrity check in decryption of said cipher-text to reform said plain-text message.

The invention may also be implemented as an article of manufacture comprising a computer usable medium having computer readable program code means embodied therein for causing encryption of a plain-text message, the computer readable program code means in the article of manufacture comprising computer readable program code means for causing a computer to effect the apparatus and/or steps of methods of the present invention.

The invention may also be implemented as a computer program product comprising a computer usable medium having computer readable program code means embodied therein for causing encryption of a plain-text message, the computer readable program code means in the computer program product comprising computer readable program code means for causing a computer to effect the apparatus and/or the steps of methods of the present invention.

The invention may also be implemented as a program storage device readable by machine, tangibly embodying a program of instructions executable by the machine to perform method steps for encrypting a plain-text message, said method steps comprising the steps of methods and/or apparatus of the present invention.

Overview of Example Embodiment

Symmetric key encryption has become an integral part of today's world of communication. It refers to the schemes and algorithms used to secretly communicate data over an insecure channel between parties sharing a secret key. It is also used in other scenarios like data storage.

There are two primary aspects of any security system: confidentiality and authentication. In its most prevalent form, confidentiality is attained by encryption of bulk digital data using block ciphers. The block ciphers (e.g. DES, AES), which are used to encrypt fixed length data, are used in various chaining modes to encrypt bulk data. One such mode of operation is cipher block chaining (CBC). The security of CBC has been well studied ([1] M. Bellare, A. Desai, E. Jokiph, P. Rogaway, "A Concrete Security Treatment of Symmetric Encryption: Analysis of the DES Modes of OPeration", 38th IEEE FOCS, 1997).

Cipher block chaining of block ciphers is also used for authentication. The CBC-MAC (CBC Message Authentication Code) is an international standard. The security of CBC MAC was demonstrated in ([2] M. Bellare, J. Kilian, P. Rogaway, "The Security of Cipher Block Chaining", CRYPTO 94, LNCS 839, 1994). Authentication in this setting is also called Message Integrity.

Despite similar names, the two CBC modes, one for encryption and the other for MAC are different, as in the latter the intermediate results of the computation of the MAC are kept secret. In fact in most proprietary security systems, two different passes with two different keys, one each of the two modes is used to achieve both confidentiality and authentication.

Nevertheless, it is enticing to combine the two passes into one, that is in a single cipher block chaining pass, both confidentiality and authentication are assured. Many such attempts have been made, which essentially use a simple checksum or manipulation detection code (MDC) in the chaining mode ([3] V. D. Gligor, P. Donescu, "Integrity Aware PCBC Encryption Schemes", 7th Intl. Workshop on Security Protocols, Cambridge, LNCS, 1999). Unfortunately, all such previous schemes are susceptible to attacks (see e.g. the Section on Lower Bound).

Recently we presented a new variant of CBC mode, which in a single pass achieves both confidentiality and authentication. To encrypt a message of length m blocks, it requires a total of (m+log m) block encryptions. All other operations are simple operations, like exclusive-or. To contrast this with the usual CBC mode, the encryption pass requires m block encryptions, and the MAC computation requires another m block encryptions.

We also show that there is indeed a matching lower bound to our mode of operation, in a reasonable (linear) model of computation. This also explains why all previous attempts which tried to attain both features together, without the extra log m cryptographic operations, have failed.

A simpler (though not as efficient) version of the mode just requires a usual CBC encryption of the plain-text appended with the checksum (MDC), with a random initial vector r. As already mentioned, such a scheme is susceptible to message integrity attacks. However, if one "whitens" the complete output with a random sequence, the scheme becomes secure against message integrity attacks. Whitening just refers to xor-ing the output with a random sequence. The random sequence could be generated by running the block cipher on r+1, r+2, ... r+m (but with a different shared key). This requires m additional cryptographic operations, and hence is no more efficient than generating a MAC.

The efficiency of this new mode comes from proving that the output whitening random sequence need only be pair-wise independent. In other words, if the output whitening sequence is $s_1, s_2, \ldots s_m$, then each $s_i$ is required to be random, but only pair-wise-independent of the other entries. Such a sequence is generated by performing only log m cryptographic operations like block encryption.

We now show that an even weaker condition than pair-wise independence suffices. A sequence of uniformly distributed n-bit random numbers $s_1, s_2, \ldots s_m$, is called pair-wise differentially-uniform if for every constant c, and every pair i, j, i≠j, probability that $s_i \oplus s_j$ is c is $2^{-1}$. We show that the output whitening sequence need only be pair-wise differentially-uniform.

The pair-wise independent sequence generated to assure message integrity can also be used to remove chaining from the encryption mode while still assuring confidentiality. This results in a mode of operation for authenticated encryption which is highly parallelizable. Once again, we now show that a pair-wise differentially-uniform sequence suffices to guarantee security of both confidentiality and authentication in this parallelizable version.

Recently, another scheme was proposed in ([4] V. G. Gligor, P. Donescu Fast Encryption and Authentication: XCBC Encryption and XECB Authentication Modes "http://www.nist.gov/aes/modes"), where the output is whitened with the sequence r, 2r, 3r, . . . . However, this scheme is not as secure as whitening the sequence with either the pair-wise independent sequence or the pair-wise differentially-uniform sequence.

We first prove the theorems for the variants which employ sequences which are pair-wise independent. These are described in FIG. 11 and FIG. 12. They are different from the example embodiments (i.e. FIG. 4 and FIG. 8) in that to generate a pair-wise independent sequence at least two new pseudo random numbers need to be generated (i.e. $W_1$, #F: in FIG. 11), as opposed to just one pseudo random number R in the example embodiments in FIG. 4 and FIG. 8. The proof of security of the scheme in FIG. 11 (i.e. the one using pair-wise independent sequence) can then be generalized to prove the security of the example embodiment (i.e. the one using pair-wise additively-uniform sequence).

Figure 11:
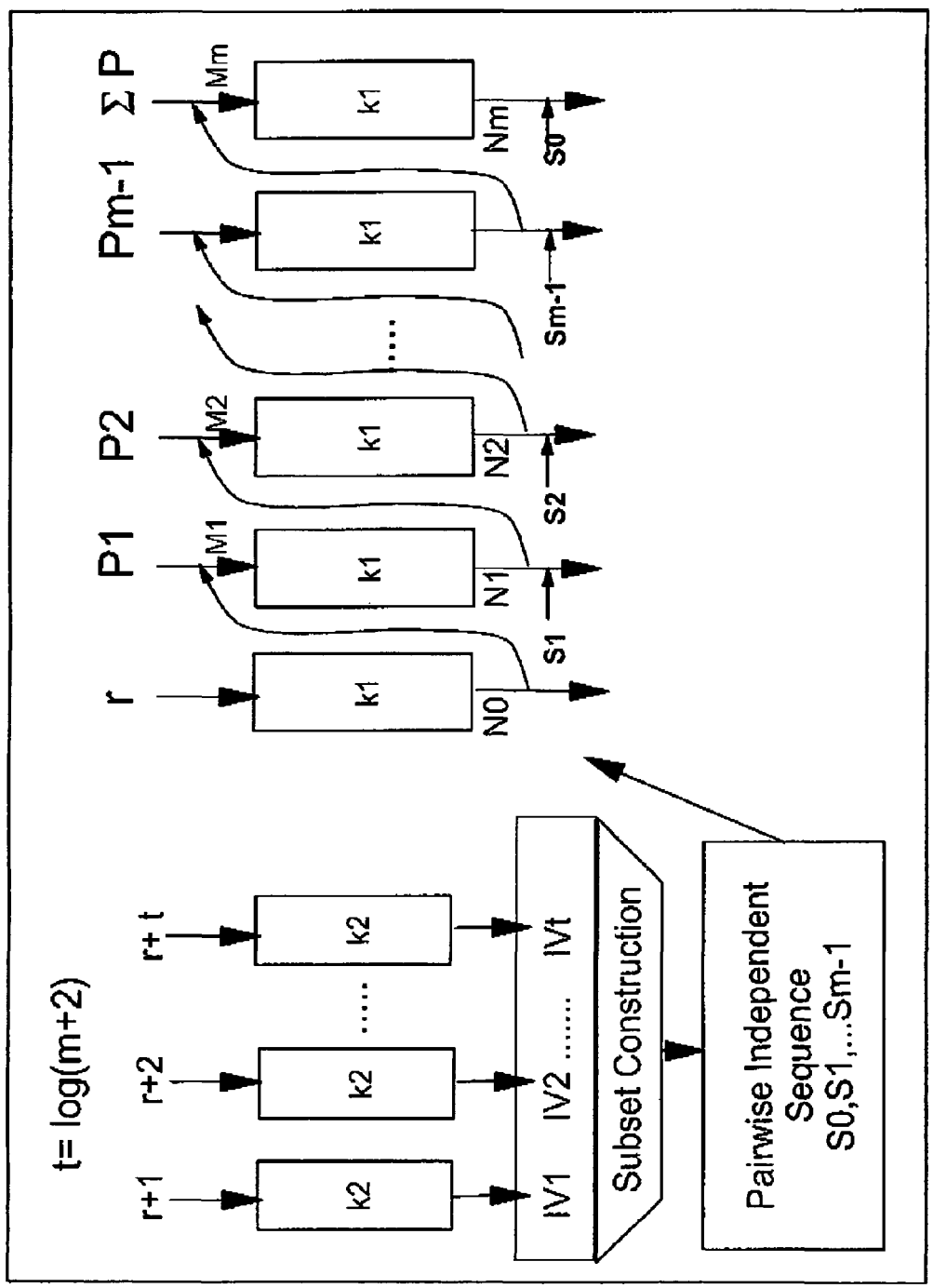
Figure 12:
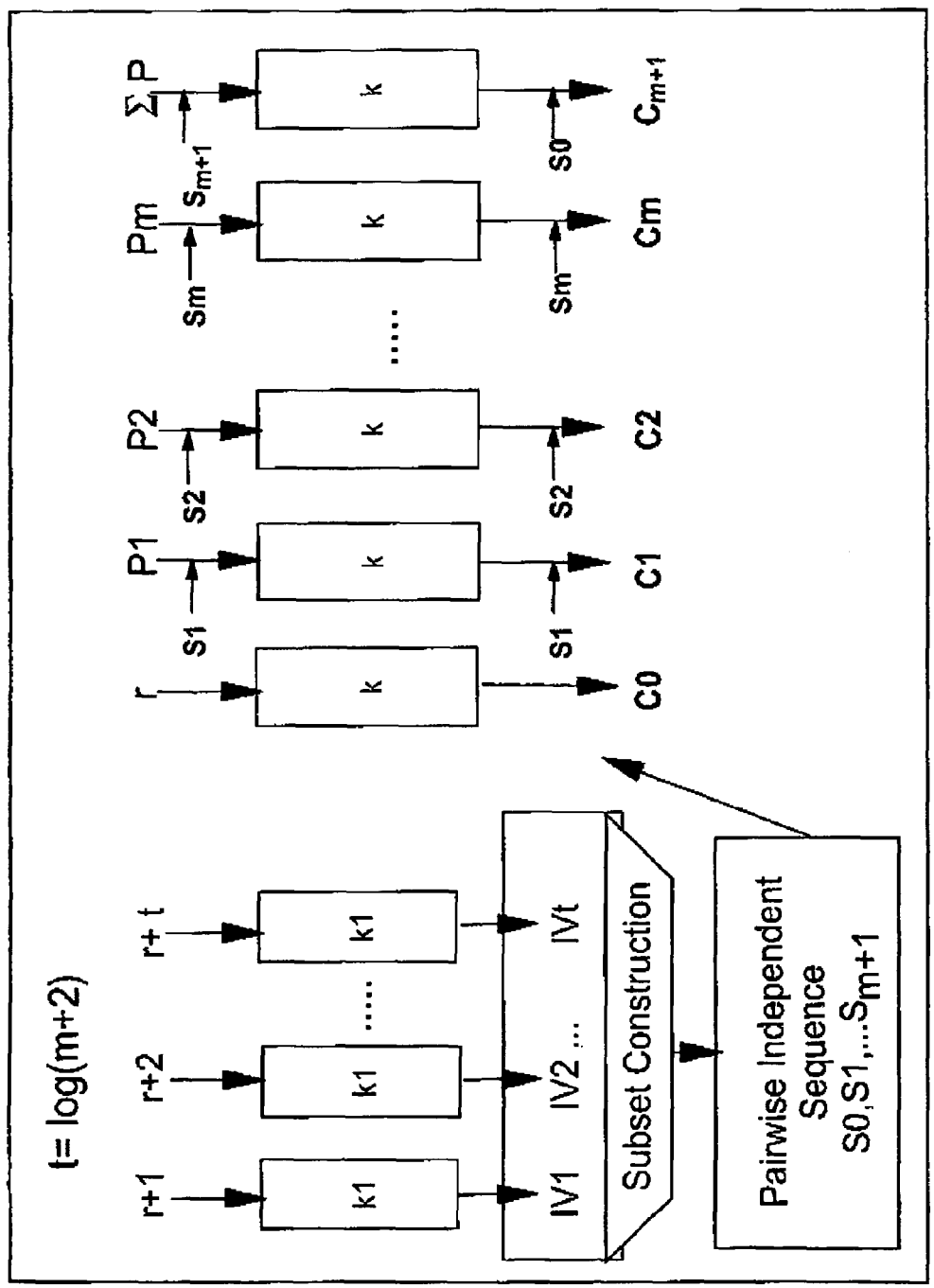

In FIG. 11 (and also in FIG. 12) a subset construction is employed to produce the seqeunce $S_0, S_1, \ldots S_{m-1}$ from $IV_1$, $IV_2, \ldots, IV_t$. The subset construction works as follows (t=⌈log(m+2)⌉):

for i=1 to $2^t-1$ do

Let $<a_1, a_2, \ldots a_t>$ be the binary representation of i $$S_{i-1} = \sum_{j=1}^{t} (a_j \cdot IV_j)$$

end for

The summation in the for loop above is an xor-sum.

The scheme in FIG. 11 will be referred to as the IACBC scheme. The scheme in FIG. 12 will be referred to as the IAPM scheme.

The rest of the paper is organized as follows. The next section gives definitions of random permutations, and formalizes the notions of security, for both confidentiality and message integrity. Next we state the theorem for the security of the new modes of operation. We then prove that the new scheme is secure for message integrity. Lastly, we describe our model of computation for the lower bound, and prove the lower bound.

Preliminaries and Definitions

Random Permutation-Like Functions

Definition (Random Function) A Random function is a function chosen randomly from $\{0, 1\}^n \to \{0, 1\}^l$. It could also be viewed as a random sequence (uniformly chosen) of length $2^n$ of l bit strings.

Definition (Random Permutation) A Random permutation is a function chosen randomly from class of permutations in $\{0, 1\}^n \to \{0, 1\}^n$. It could also be viewed as a random sequence chosen uniformly from the class of all $2^n$ length sequences of l bit strings, such that each l bit string is represented once in every sequence.

The following notion is new (i.e. non-standard). The new notion and the following theorem help simplify the proof of message integrity. It essentially separates the approximations in calculating the success probability that result from replacing random permutations by random functions in Theorem 3.

Definition (Random Permutation-like Functions (RPF)) A Random Permutation-like Function with parameter q is a pair of random functions <f,g>, with the following restriction For i ∈[1 . . . q] define π(i)=min{j: j≤q and f(j)=f(i)} if j=f(i) for some i≤q, j arbitrary, then g(j)=π(i).

A permutation f can be viewed as a pair <f, $f^{-1}$>.

Theorem 1: Let <F, G> be a random permutation-like function with parameter q. Let P be a random permutation. Consider an adversary which is allowed calls to a pair of oracles <$O_1, O_2$>, with the restriction that it is only allowed to call $O_1$ on inputs 1, 2, . . . , q, whereas there is no restriction on calls to $O_2$. Any such adversary A that makes at most q total queries to a pair of oracles has probability at most $q^2/2^n$ of distinguishing <F,G> from <P,$P^{-1}$>.

Definition (pair-wise differentially-uniform): A sequence of uniformly distributed n-bit random numbers $s_1, s_2, \ldots s_m$, is called pair-wise differentially-uniform if for every n-bit constant c, and every pair i, j, i≠j, probability that $s_i \oplus s_j$ is c is $2^{-1}$.

Definition A sequence of random numbers $s_1, s_2, \ldots s_m$ uniformly distributed in GFp, is called pair-wise differentially-uniform in GFp if for every constant c in GFp, and every pair i, j, i ≠j, probability that $(s_i-s_j)$ mod p is c is 1/p.

Encryption Schemes: Message Security with Integrity Awareness

We give definitions of schemes which explicitly define the notion of secrecy of the input message. Of course, pseudo-random permutations can be used to build encryption schemes which guarantee such message secrecy ([1]).

In addition, we also define the notion of message integrity. Moreover, we allow arbitrary length input messages (upto a certain bound).

Let Coins be the set of infinite binary strings. Let $l(n)=2^{O(n)}$, and $w(n)=O(n)$. Let N be the natural numbers.

Definition A (probabilistic, symmetric, stateless) encryption scheme with message integrity consists of the following:

initialization: All parties exchange information over private lines to establish a private key $x \in \{0, 1\}^n$. All parties store x in their respective private memories, and |x|=n is the security parameter.

message sending with integrity awareness:

Let $E:\{0,1\}^n \times \text{Coins} \times N \times \{0,1\}^{l(n)} \to \{0, 1\}^{l(n)}$ $D:\{0,1\}^n \times N \times \{0,1\}^{l(n)} \to \{0,1\}^{l(n)+w(n)}$ $MDC: N \times \{0,1\}^{l(n)} \to \{0,1\}^{w(n)}$ be polynomial-times function ensembles. In E, the third argument is supposed to be the length of the plain-text. Similarly, in D the second argument is the length of the cipher-text. We will drop this argument when it is clear from context. The functions E and D have the property that for all $x \in \{0,1\}^n$, for all $m \in \{0,1\}^{l(n)}$, $c \in \text{Coins}$ $D_x(E_x(c,m))=m\|MDC(m)$ We will usually drop the random argument to E as well, and just think of E as a probabilistic function ensemble. We will also drop n when it is clear from context. Thus we will write l for l(n) etc.

Definition (Security under Find-then-Guess [1]) Consider an adversary A that runs in two stages. During the adversary's find stage he endeavors to come up with a pair of equal length messages, $m^0$, $m^1$, whose encryptions he wants to tell apart. He also retains some state information s. In the adversary's guess stage he is given a random cipher-text y for one of the plain-texts $m^0$, $m^1$, together with s. The adversary is said to "win" if he correctly identifies the plain-text.

An Encryption Scheme is said to be (t, q, $\mu$, $\epsilon$)-secure in the find-then-guess sense, if for any adversary A which runs in time at most t and asks at most q queries, these totaling at most $\mu$ bits, $Adv_A \stackrel{def}{=} 2 \cdot Pr[(m^0, m^1, s) \leftarrow A^{E_x(\cdot)}(\text{find});$ $b \leftarrow \{0, 1\}; y \leftarrow E_x(m^b) : A^{E_x(\cdot)}(\text{guess}, y, s) = b] - 1 \le \epsilon$ Definition (Integrity Awareness): Consider an adversary A running in two stages. In the first stage (find) A asks r queries of the oracle $E_x$. Let the oracle replies be $C^1, \ldots C^r$. Subsequently, A produces a cipher-text C, different from each $C^i$, $i \in [1 \ldots r]$. Since D has length of the cipher-text as a parameter, the breakup of $D_x(C)$ as m||m', where |m'|=w(n), is well defined. The adversary's success probability is given by $$Succ \stackrel{def}{=} Pr[MDC(m) = m']$$

Message Secrecy

We state the theorem for security under the Find-then-Guess notion of security. The proof follows standard techniques ([1]).

Theorem 2: Let A be an adversary attacking the encryption scheme IACBC in FIG. 10 (with f being a random function F) in the find-then-guess sense, making at most q queries, totaling at most $\mu$ bits. Then, $$Adv_A \le \left(\frac{\mu^2}{n^2} - \frac{\mu}{n}\right) \cdot \frac{1}{2^n}$$

Message Integrity

In this section we show that the mode of operation IACBC in FIG. 10 guarantees message integrity with high probability.

We start with some informal observations to aid the reader in the eventual formal proof. First thing to note is that since each encryption has a new random seed r, it does not help the adversary to have more than one pair of plain-text cipher-text messages. Thus, essentially the problem of message integrity is the following. Given $P^1$, and corresponding $C^1$, can the adversary generate another $C^2$ different from $C^1$, such that on decryption the plain-text passes the integrity check.

We will take the following approach. We first restrict ourselves to the random permutation-like function model. That is, we model the block cipher by a random permutation-like function. Using Theorem 1, one can show that the following theorem also holds for the random permutation model. Finally, yet another standard reduction shows that the theorem holds for pseudorandom permutations.

Theorem 3: Let A be an adversary attacking the IACBC encryption scheme with random permutation-like function <F, G> making at most r queries in the first stage, totaling at most $\mu$ bits (where $\mu \le qn$, q being the parameter of F). Then, $$Succ < \left(\frac{\mu^2}{n^2}\right) \cdot \frac{1}{2^n} + O\left(\frac{\mu}{n}\right) \cdot \frac{1}{2^n}$$

Proof:

For sake of clarity, we assume that the adversary only has one query in the first stage with plain-text P of length m blocks and corresponding cipher-text C ($\mu=mn$).

In the first stage, we do a modification to the IACBC algorithm. The modified algorithm uses $F(\xi(i))$ instead of $F(M_i)$ for queries $F(M_i)$, where $\xi(i)=\min \{j : j \le i \text{ and } M_j=M_i\}$ Given that F is random, the behavior of the modified algorithm and the original algorithm is identical.

Its query in the second stage is with cipher-text $C'\neq C$. We will used primed variables to denote the variables in the second stage. For example, $P'_m$ will denote the last decrypted block (if $C'=C_0', \ldots C_m'$).

First note that, r, $IV_1, IV_2, \ldots, IV_t$ are uniformly random and independent variables. Also, they are all independent of P.

Now assume that P and r are such that $$\forall i,j \in [0 \ldots m]: M_i \neq M_j$$

This happens with high probability as in Theorem 2. This implies that $N_0, N_1, \ldots, N_m$ are uniformly random and independent variables. Also, they are all independent of r, $IV_1, IV_2, \ldots, IV_t$.

We first consider the case where the length of C' and C is same.

Let i be the smallest index in which C and C' differ. It is easy to see that $N_i \neq N_i'$. The case i=m is trivial, as $M_m' \neq M_m$ with high probability, and hence $$P'_m \neq \sum_{i=1}^{m-1} P'_i = \sum_{i=1}^{m-1} P_i.$$

Next, we consider the case $i \in [1 \ldots m-1]$. We first prove the following:

With high probability the following does not hold:

$$\exists j: j=0 \ldots m, N_i'=N_j \quad (1)$$

or $$\exists j: j=0 \ldots m, j\neq i, N_i'=N_j' \quad (2)$$

Now, $N_i' = C_i' \oplus S_i$, as $S_i' = S_i$, i being greater than zero. Thus, for (1) to hold for a particular j would require $$S_i \oplus S_j = C_i' \oplus C_j$$

But, $C_j = N_j \oplus S_j$ (for j>0), and $N_j$ is independent of $S_j$. In fact, since $N_0, N_1, \ldots, N_m$ are independent and independent of $IV_1, IV_2, \ldots, IV_t$, the set of variables $C_0, C_1, \ldots, C_m$ are independent and also independent of $IV_1, IV_2, \ldots, IV_t$, and hence independent of each $S_k$ (for any $k \in [0 \ldots m]$). This fact that variables $C_0, C_1, \ldots, C_m$ are independent of $IV_1, IV_2, \ldots, IV_t$ can be seen as follows, where $c_0, \ldots c_m$ are any constants:

$$\text{Prob}\left[\bigwedge_i C_i = c_i \middle| IV_1, \ldots IV_t\right]$$

$$= \text{Prob}\left[\bigwedge_i N_i = c_i \oplus S_i \middle| IV_1, \ldots IV_t\right]$$

$$= \prod_i \text{Prob}[N_i = c_i \oplus S_i]$$

$$= \prod_i \text{Prob}[C_i = c_i]$$

$$= \text{Prob}\left[\bigwedge_i C_i = c_i\right]$$

The second equation above follows because $N_0, N_1, \ldots, N_m$ are independent of each other and independent of $IV_1, \ldots IV_t$.

Thus, $S_k$ (for each k) is independent of whole of C. In fact, the previous argument is easily generalized to prove that $S_k$ is independent of C and P. Also, C' is completely determined by C and P (i.e. C' is a function only of C and P), and hence $S_k$ is independent of C and C'. Since $i \neq j$ (we already know that $N_i \neq N_i'$), $S_i \oplus S_j = S_k$, for some $k \in [0 \ldots m]$. Since, $S_k$ is random and independent of C and C', the probability that $S_k = C_i' \oplus C_j$ is $2^{-n}$. The case when j=0 is proved similarly.

For case (2), for j<i, $N_j' = N_j$, and hence case (1) applies. For case (2) to hold for a particular j>i would require $$S_i \oplus S_j = C_i' \oplus C_j'$$

Again, as before, $S_k$ (for any $k \in [0 \ldots m]$) is independent of $C_i' \oplus C_j'$. And hence the probability is at most $2^{-1}$.

Thus, the disjunction (1) or (2) holds with probability at most $2(m+1) * 2^{-n}$.

Now, we consider the case i=0, i.e. $C_0' \neq C_0 = N_0$. We show that with high probability, for all $j \in [1 \ldots m]$, $C_0' \neq N_j$. We consider the individual event $N_j = C_0'$, or $S_j = C_0' \gamma C_j$. Again, $S_j = C_0' \gamma C_j$ holds with probability $2^{-n}$. Thus, with probability at most $m*2^{-n}$, there exists a $j \in [1 \ldots m]$ such that $C_0'(=N_0') = N_j$.

Thus, $M_0' = G(N_0')$ is a random variable independent of all previous variables. This implies, that with high probability, $IV_1', \ldots IV_t'$ are random and independent variables, independent of all previous variables r, $IV_1, \ldots IV_t, N_0, N_1, \ldots N_m$. Thus, with high probability $N_1' \neq N_1$, and now the previous case applies.

Thus, we have that with high probability, there is an $i \in [1 \ldots m-1]$ such that $$\forall j, j \in [0 \ldots m]: N_i' \neq N_j \quad (1)$$

and $$\forall j, j \in [0 \ldots m], j \neq i: N_i' \neq N_j' \quad (2)$$

Thus, $M_i' = G(N_i')$ is a random variable independent of all of r, r', $IV_1, IV_1', \ldots IV_t, IV_t', N_0, N_0', \ldots N_m, N_m'$, and also independent of $P_1, P_2, \ldots P_{m-1}$, and all $M_j'$ ($j \neq i$).

Now, $$P'_m = \sum_{j=1}^{m-1} P'_j = \sum_{j=1}^{m-1} (M'_j \oplus N_{j-1}) \text{ and } MDC(P) = \sum_{j=1}^{m-1} P_j$$

Thus, the event we are interested in is $$M'_i = \sum_{j=1}^{m-1} (P_j \oplus N_{j-1}) \oplus \sum_{j\neq i} M'_j$$

The LHS being independent of RHS, the probability of the event is $2^{-n}$.

For the case when the lengths of C and C' are different, we just remind the reader that a designated set $S_0$ is used in the last block.

Note that the proof of Theorem 3 only required that $S_i \gamma S_j$ equal a constant with low probability. Infact, the theorem holds for an encryption scheme where a pair-wise differentially-uniform sequence of uniformly distributed random numbers is used instead of a pair-wise independent sequence of uniformly distributed random numbers.

Similalry, Theorem 2 holds for an encryption scheme employing a pair-wise differentially-uniform sequence of uniformly distributed random numbers.

Theorem 2 and 3 also hold for encryption schemes which employ sequences which are pair-wise differentially-uniform in GFp; the success probabiltites, however are now in terms of $1/p$ instead of $1/2^n$.

Security of the Parallel Mode

Theorem 4: Let A be an adversary attacking the IAPM encryption scheme (with f being a random function F) in the find-then-guess sense, making at most q queries, totaling at most $\mu$ bits. Thsn, $$Adv_A \leq \left(\frac{\mu^2}{n^2} - \frac{\mu}{n}\right) \cdot \frac{1}{2^n}$$

Theorem 3 continues to hold for IAPM.

Theorem 4 also holds for an encryption scheme variant of IAPM employing a pair-wise differentially-uniform sequence of uniformly distributed random numbers.

Lower Bound

In this section we show that the log m additional cryptographic operations in the IACBC scheme are essentially the least one has to do to assure message integrity along with message secrecy.

We consider the following model. We assume a fixed block size n for a block cipher (or random permutations or length preserving random functions). Any application of one of these will constitute one application of a cryptographic operation. The only other operations allowed are linear operations over $(GF2)^n$, i.e. bit-wise exclusive-or. Of course, operations of testing whether an n bit quantity is zero is also allowed. Since, the scheme could be probabilistic, as IACBC is, we also allow v blocks of randomness, $r_1, \ldots, r_v$.

Let, the message to be encrypted be of size m blocks, i.e. mn bits. Call the input blocks $P_1, \ldots, P_m$. Let there be m+k invocations of random functions, and let the inputs to these functions be $M_1, M_2, \ldots, M_{m+k}$. Similarly, let the outputs of these random functions be $N_1, N_2, \ldots, N_{m+k}$. Let, $C=C_1, C_2, \ldots C_{m+t}$ be a linear function of P's, r's, M's and N's. Here $0 \leq t \leq k$.

Our aim is to show that either the scheme is not secrecy secure, or it is not message integrity secure, or it is not invertible, or $k+v=\Omega(\log n)$. More formally, we would like the scheme to behave as a random function from mn bits to (m+t)n bits. The scheme is not secrecy secure if an adversary can distinguish the scheme from such a random function with probability $\geq 1-2^{-1}$.

For message integrity, let there be u>0 MDC functions $D_1, D_2, \ldots, D_u$. Without loss of generality (see below), assume that these are linear functions of r's, M's and N's, and they are linearly independent. The scheme is not message integrity secure, if given P and C, an adversary can produce a $C' \neq C$, such that on inversion, all the MDC functions evaluate to zero with high probability.

For invertibility, we assume the scheme has the following structure: There is a subset of N's which can be written as linear functions of just the C's. The corresponding M's then may lead to determination of some more M's, and hence N's. Using, these new M's and N's, a second subset of N's can be written as a linear combination of previously determined M's, N's and C, and so on. We are forced to take this approach, as by just allowing a system of equations with unique inverse is not enough. The unique inverse may exist but may not be efficiently computable. For example, $C_1=M_1 \gamma N_1$, may have a unique inverse, but may be intractable to compute.

Due to the fact that C is completely determined by r's, M's, N's and P's, it follows from the above characterization that C can be expressed as linear expressions in only N's, M's and r's. For otherwise, the scheme is not secrecy secure (i.e. there is a linear relationship between only C's and P's). Similarly, P can be expressed as linear expressions in only N's, M's and r's. This justifies the above restriction on MDCs.

Proof:

Let $$D_i = \sum_{j=1}^{m+k}(a_j^i \cdot M_j) \oplus \sum_{j=1}^{m+k}(b_j^i \cdot N_j) \oplus \sum_{j=1}^{v}(c_j^i \cdot T_j)$$

We say that $N_i$ and $N_j$ resolve if $N_i \gamma N_j$ can be written as a linear combination of only the C's and the P's. Similarly, for $M_i$ and $M_j$.

Suppose there exists a pair i, j, i $\neq$ j, i, j $\in$ [1 ... m+k] such that
1. $N_i$ and $N_j$ resolve
2. $M_i$ and $M_j$ resolve
3. For all x $\in$ [1 ... u], $a_i^x \gamma a_j^x = 0$, and $b_i^x \gamma b_j^x = 0$ Then, we show that an adversary can produce a new $C' \neq C$, such that all the MDC functions evaluate to zero. Note that, if there exists a C' such that
$N_i' = N_j$
$N_j' = N_i$
for all other x, $N_x' = N_x$ then, we have a similar set of relations for M, and hence given (3), all the MDC functions would evaluate to zero.

Since C can be expressed only in terms of N's, M's and r's it is not difficult to come up with such a C'. Moreover, we have also assumed in our schemes, that a C' uniquely determines N', and M'.

Finally, we show that if k+v is not $\Omega(\log n)$, then there exists a pair i, j satisfying (1), (2) and (3). Let $$[P_1 \ldots P_m r_1 \ldots r_v N_1 \ldots N_{m+k}] \cdot B = [C_1 \ldots C_m]$$

The rank of the matrix B is m. For a fixed P, let the resulting matrix be B', i.e.

$$[r_1 \ldots r_v N_1 \ldots N_{m+k}] \cdot B' = [C_1 \ldots C_m]$$

The rank of the new matrix B' is still m, for otherwise we have a non-trivial linear relationship between C and P, and hence the scheme is not random. This implies that $$[r_1 \ldots r_v N_1 \ldots N_{m+k}] = [f(C)] + (GF2)^n V_1 + \ldots + (GF2)^n V_{k+v}$$

where f(C) is a set of linear functions of C's, and $V_i$ are linearly-independent binary row-vectors. For a subset of N's with indices a set J $\subseteq$ [1 ... m+k] to be pair-wise independent thus requires k+v>log |J|. In other words, there exists i, j $\in$ J, i $\neq$ j, $N_i$ and $N_j$ resolve if k+v<log |J|. Stated differently, there is a set of size $|J|=(m+k)/2^{k+v}$ in which all pairs of N's resolve with each other. A similar statement holds for M's. Thus, there is a set of size $|J|=(m+k)/2^{2(k+v)}$ in which all pairs of N's resolve with each other, and all pairs of M's resolve with each other.

Similarly, a set of size $|J|=(m+k)/2^u$ has $$\forall k \in [1 \ldots u], \forall i,j \in J: a_i^k \in a_j^k = 0$$

Combining these arguments, we get that there exists a pair satisfying (1), (2) and (3) if 2u+2(k+v)<log n.

To complete the proof, we show that $(k+v) \geq u$. We can write P's and D's as linear functions of r's, M's and C's (as discussed earlier N's can be replaced by r's, M's and C's). Thus, we have a matrix A such that $$[C_1 \ldots C_m r_1 \ldots r_v M_1 \ldots M_{m+k}] \cdot A = [P_1 \ldots P_m D_1 \ldots D_u]$$

The matrix A has rank at least m+u, for otherwise one would get a non-trivial linear relationship between D's and P's. In fact, for a fixed C, the rank of the resulting matrix A' is still at least m+u, for otherwise we would get a non-trivial linear relationship between D's, P's and C's. However, on a valid encryption, D's evaluate to zero. Thus, for valid encryptions we have a non-trivial linear relationship between the P's and the C's, which renders the encryption distinguishable from random. Thus, m+k+v≧m+u.

A new mode of operation for combining confidentiality and authentication was recently described in [3]. The mode of operation is called IA-PCBC (Integrity Aware Plain-Text Cipher-Text Block Chaining). It was however shown by the author that the scheme is not secure for message integrity. We just remark here that the scheme was essentially as described in the model in this section. To encrypt a m blocks, only m+2 block encryptions are employed in IA-PCBC. The claimed security came from mixing addition over integers modulo $2^n$, with exclusive-or operations. However, one can be approximated in terms of others with reasonably high probability, and then the attack follows by the lower bound.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

While it is apparent that the invention herein disclosed is well calculated to fulfill the objects stated above, it will be appreciated that numerous modifications and embodiments may be devised by those skilled in the art, and it id intended that the appended claims cover all such modifications and embodiments as all within the true spirit and scope of the present invention.

What is claimed is:

1. A method for encrypting a plain-text message, the method comprising:
   generating a first random number;
   transforming said first random number into a first pseudo random number;
   further expanding a randomness of said first random number and/or said first pseudo random number into a set of pair-wise differentially-uniform pseudo random numbers;
   dividing said plain-text message into a plurality of plain-text blocks;
   encrypting said plain-text blocks to form a plurality of cipher-text blocks;
   combining said plurality of plain-text blocks into at least one check sum; and
   employing said set of pair-wise differentially-uniform pseudo random numbers, together with said first random number and/or said first pseudo random number, to embed a message integrity check in said cipher-text blocks.

2. A method as recited in claim 1, wherein the step of encrypting said plain-text blocks includes employing said first random number, and/or said first pseudo random number, and/or said set of pair-wise differentially-uniform pseudo random numbers.

3. A method as recited in claim 2, wherein the step of employing includes:
   pairing said first random number, and/or said first pseudo random number, and/or said set of pair-wise differentially-uniform pseudo random numbers, with said plurality of plain-text blocks; and
   combining each pair to form a plurality of input blocks used in said step of encrypting.

4. A method as recited in claim 3, wherein the step of combining each pair includes performing an exclusive-or operation upon components of said each pair.

5. A method as recited in claim 3, wherein p is a prime number, and the step of combining each pair includes performing a modulo p addition upon components of said each pair.

6. A method as recited in claim 3, wherein the step of combining each pair includes performing an addition in a group upon components of said each pair.

7. An article of manufacture comprising a computer usable medium having computer readable program code means embodied therein for causing encryption of a plain-text message, the computer readable program code means in said article of manufacture comprising computer readable program code means for causing a computer to effect the steps of claim 2.

8. A computer program product comprising a computer usable medium having computer readable program code means embodied therein for causing encryption of a plain-text message, the computer readable program code means in said computer program product comprising computer readable program code means for causing a computer to effect the steps of claim 2.

9. A program storage device readable by machine, tangibly embodying a program of instructions executable by the machine to perform method steps for encrypting a plain-text message, said method steps comprising the steps of claim 2.

10. A method as recited in claim 1, wherein the step of employing includes pairing said first random number, and/or said first pseudo random number, and/or said set of pair-wise differentially-uniform pseudo random numbers, with said plurality of cipher-text blocks; and
    combining each pair to form a plurality of output blocks.

11. A method as recited in claim 10, wherein the step of combining each pair includes performing an exclusive-or operation upon components of said each pair.

12. A method as recited in claim 10, wherein p is a prime number, and the step of combining each pair includes performing a modulo p addition upon components of said each pair.

13. A method as recited in claim 10, wherein the step of combining each pair includes performing an addition in a group upon components of said each pair.

14. A method as recited in claim 1, wherein the step of encrypting includes encrypting said first random number.

15. A method as recited in claim 1, wherein the step of encrypting includes encrypting said check sum.

16. A method as recited in claim 1, wherein the step of combining includes obtaining said check sum from an exclusive-or of said plurality of plain-text blocks.

17. A method as recited in claim 1, wherein the step of transforming said random number includes a non-cryptographic or linear operation.

18. A method as recited in claim 1, wherein the step of transforming said random number includes a cryptographic operation.

19. A method as recited in claim 1, wherein said set of pair-wise differentially-uniform numbers are set of pair-wise differentially-uniform numbers in GFp.

20. An article of manufacture comprising a computer usable medium having computer readable program code means embodied therein for causing encryption of a plain-text message, the computer readable program code means in said article of manufacture comprising computer readable program code means for causing a computer to effect the steps of claim 1.

21. A computer program product comprising a computer usable medium having computer readable program code means embodied therein for causing encryption of a plain-text message, the computer readable program code means in said computer program product comprising computer readable program code means for causing a computer to effect the steps of claim 1.

22. A program storage device readable by machine, tangibly embodying a program of instructions executable by the machine to perform method steps for encrypting a plain-text message, said method steps comprising the steps of claim 1.

23. A method as recited in claim 1, wherein the step of encrypting said plain-text blocks is performed in parallel for a plurality of said plain-text blocks.

24. A method for decrypting a cipher-text message, the method comprising:
 dividing said cipher-text message into a plurality of cipher-text blocks;
 decrypting said cipher-text blocks in forming a plurality of plain-text blocks;
 transforming at least one of said plain-text blocks into a first pseudo random number;
 further expanding at least one of said plain-text blocks and/or said first pseudo random number into a set of pair-wise differentially-uniform pseudo random numbers;
 combining said set of pair-wise differentially-uniform pseudo random numbers, and said first pseudo random number and/or said at least one plain-text block to form at least two check sums and to form a plurality of output blocks; and
 comparing said at least two check sums in declaring success of a message integrity check.

25. A method as recited in claim 24, wherein the step of decrypting said cipher-text blocks includes employing said first pseudo random number, and/or said set of pair-wise differentially-uniform pseudo random numbers.

26. A method as recited in claim 25, wherein the step of employing includes:
 pairing said first random number, and/or said first pseudo random number, and/or said set of pair-wise differentially-uniform pseudo random numbers, with said plurality of cipher-text blocks; and
 combining each pair to form a plurality of input blocks used in said step of decrypting.

27. A method as recited in claim 26, wherein p is a prime number, and the step of combining each pair includes performing a modulo p addition upon components of said each pair.

28. A method as recited in claim 26, wherein the step of combining each pair includes performing an exclusive-or operation upon components of said each pair.

29. A method as recited in claim 26, wherein the step of combining each pair includes performing an addition in a group upon components of said each pair.

30. An article of manufacture comprising a computer usable medium having computer readable program code means embodied therein for causing decryption of a cipher-text message, the computer readable program code means in said article of manufacture comprising computer readable program code means for causing a computer to effect the steps of claim 25.

31. A computer program product comprising a computer usable medium having computer readable program code means embodied therein for causing decryption of a plain-text message, the computer readable program code means in said computer program product comprising computer readable program code means for causing a computer to effect the steps of claim 25.

32. A program storage device readable by machine, tangibly embodying a program of instructions executable by the machine to perform method steps for decrypting a cipher-text message, said method steps comprising the steps of claim 25.

33. A method as recited in claim 24, wherein the step of combining includes:
 pairing said first pseudo random number, and/or said set of pair-wise differentially-uniform pseudo random numbers, with said plurality of plain-text blocks; and
 using each pair to form a plurality of output blocks and employing the output blocks to form said at least two check sums.

34. A method as recited in claim 33, wherein the step of using each pair includes performing an exclusive-or operation upon components of said each pair.

35. A method as recited in claim 33, wherein the step of forming includes:
 dividing said output blocks into at least two subsets, and obtaining said at least two checksums from an exclusive-or of said subsets of output blocks.

36. A method as recited in claim 33, wherein p is a prime number, and the step of using each pair includes performing a modulo p addition upon components of said each pair.

37. A method as recited in claim 33, wherein the step of using each pair includes performing an addition in a group upon components of said each pair.

38. A method as recited in claim 24, wherein the step of transforming said plain-text blocks includes a non-cryptographic or linear operation.

39. A method as recited in claim 24, wherein the step of transforming said plain-text blocks includes a cryptographic operation.

40. A method as recited in claim 24, wherein said set of pair-wise differentially-uniform numbers are set of pair-wise differentially-uniform numbers in GFp.

41. An article of manufacture comprising a computer usable medium having computer readable program code means embodied therein for causing decryption of a cipher-text message, the computer readable program code means in said article of manufacture comprising computer readable program code means for causing a computer to effect the steps of claim 24.

42. A computer program product comprising a computer usable medium having computer readable program code means embodied therein for causing decryption of a plain-text message, the computer readable program code means in said computer program product comprising computer readable program code means for causing a computer to effect the steps of claim 24.

43. A program storage device readable by machine, tangibly embodying a program of instructions executable by the machine to perform method steps for decrypting a cipher-text message, said method steps comprising the steps of claim 24.

44. A method for encryption/decryption of a plain-text message, the method comprising the steps of:
  generating a first random number;
  transforming said first random number into a first pseudo random number;
  further expanding a randomness of said first random number and/or said first pseudo random number into a set of pair-wise differentially-uniform pseudo random numbers;
  dividing the plain-text message into a plurality of plain-text blocks;
  encrypting said plain-text blocks in forming a plurality of cipher-text blocks;
  combining said plurality of plain-text blocks into at least one check sum; and
  employing said first random number, said first pseudo random number and said set of pair-wise differentially-uniform pseudo random numbers to embed a message integrity check in said cipher-text blocks to form a cipher-text message; and
  dividing said cipher-text message into a plurality of cipher-text blocks;
  decrypting said cipher-text blocks in forming a plurality of plain-text blocks;
  transforming at least one of said plain-text blocks into a first pseudo random number;
  further expanding at least one of said plain-text blocks and/or said first pseudo random number into a set of pair-wise differentially-uniform pseudo random numbers;
  combining said first pseudo random number, and/or said set of pair-wise differentially-uniform pseudo random numbers, and/or said at least one plain-text block to form at least two check sums and to re-form the said plain-text message; and
  comparing said at least two check sums in declaring success of a message integrity check in decryption of said cipher-text to reform said plain-text message.

45. An apparatus to encrypt a plain-text message, the apparatus comprising:
  a Randomness Generator to generate a first random number;
  a Randomness Transformer to transform said first random number into a first pseudo random number;
  a Pairwise Additively Uniform Sequence Generator to further expand a randomness of said first random number and/or said first pseudo random number into a set of pair-wise differentially-uniform pseudo random numbers;
  an Encryptor to divide said plain-text message into a plurality of plain-text blocks, and to encrypt said plain-text blocks to form a plurality of cipher-text blocks;
  a Checksum Generator to combine said plurality of plain-text blocks into at least one check sum; and
  an Integrity Extractor and Checker to employ said set of pair-wise differentially-uniform pseudo random numbers, together with said first random number and/or said first pseudo random number, to embed a message integrity check in said cipher-text blocks.

46. A method as recited in claim 35, wherein at least one element performs a plurality of operations in parallel.

47. An apparatus to decrypt a cipher-text message, the apparatus comprising:
  a Decryptor to divide said cipher-text message into a plurality of cipher-text blocks, and to decrypt said cipher-text blocks in forming a plurality of plain-text blocks;
  a Randomness Transformer to transform at least one of said plain-text blocks into a first pseudo random number;
  a Pairwise Additively Uniform Sequence Generator to further expand at least one of said plain-text blocks and/or said first pseudo random number into a set of pair-wise differentially-uniform pseudo random numbers;
  a Checksum Generator to combine said set of pair-wise differentially-uniform pseudo random numbers, and said first pseudo random number, and/or said at least one plain-text block to form at least two check sums and to form a plurality of output blocks; and
  an Integrity Extractor and Checker to compare said at least two check sums in declaring success of a message integrity check.

\* \* \* \* \*